United States Patent
Shook et al.

(10) Patent No.: US 12,395,574 B2
(45) Date of Patent: Aug. 19, 2025

(54) RADIO FREQUENCY PROTOCOL FOR A SECURITY / AUTOMATION SYSTEM

(71) Applicant: Tyco Fire & Security GmbH, Neuhausen am Rheinfall (CH)

(72) Inventors: Heather Shook, Moundsville, WV (US); Andy Hu, Los Angeles, CA (US); Ross Werner, Milwaukee, WI (US); David Laone, Milwaukee, WI (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 27 days.

(21) Appl. No.: 17/387,611

(22) Filed: Jul. 28, 2021

(65) Prior Publication Data
US 2023/0029604 A1    Feb. 2, 2023

(51) Int. Cl.
| | |
|---|---|
| H04L 29/06 | (2006.01) |
| H04L 1/1829 | (2023.01) |
| H04L 9/40 | (2022.01) |
| H04L 67/303 | (2022.01) |
| H04L 69/18 | (2022.01) |
| H04L 69/24 | (2022.01) |

(52) U.S. Cl.
CPC ............ *H04L 69/24* (2013.01); *H04L 1/1858* (2013.01); *H04L 63/0428* (2013.01); *H04L 67/303* (2013.01); *H04L 69/18* (2013.01)

(58) Field of Classification Search
CPC ... H04L 69/24; H04L 1/1858; H04L 63/0428; H04L 67/303; H04L 69/18
See application file for complete search history.

(56) References Cited

U.S. PATENT DOCUMENTS

| | | | |
|---|---|---|---|
| 11,290,538 B2* | 3/2022 | Chau | H04L 41/0894 |
| 2006/0212174 A1* | 9/2006 | Garmon | F24F 11/30 |
| | | | 700/276 |
| 2008/0253327 A1* | 10/2008 | Kohvakka | H04W 16/14 |
| | | | 370/330 |

(Continued)

OTHER PUBLICATIONS

Extended European Search Report in EP22165202.7, mailed Sep. 20, 2022, 9 pages.

*Primary Examiner* — Shean Tokuta
*Assistant Examiner* — Juan C Turriate Gastulo
(74) *Attorney, Agent, or Firm* — ArentFox Schiff LLP

(57) ABSTRACT

Example implementations include a method, apparatus, and computer-readable medium comprising receiving, by a multi-capability device from a control panel, a message configured according to a protocol that defines a packet format configurable to indicate each queried capability of the multi-capability device; transmitting, responsive to the message querying a single capability of the multi-capability device, a second message from the multi-capability device to the control panel, wherein the second message includes a packet configured according to the packet format to include a state or data value for the single capability of the device; and transmitting, responsive to the message querying at least two capabilities of the multi-capability device, a third message from the multi-capability device to the control panel, wherein the third message includes a packet configured according to the packet format to include one state or data value for each one of the at least two capabilities of the device.

24 Claims, 10 Drawing Sheets

(56) References Cited

U.S. PATENT DOCUMENTS

| | | | |
|---|---|---|---|
| 2012/0083911 A1* | 4/2012 | Louboutin | G06F 1/1632 |
| | | | 455/41.2 |
| 2012/0212071 A1* | 8/2012 | Miyabayashi | H02J 50/05 |
| | | | 307/104 |
| 2016/0057511 A1* | 2/2016 | Mullins | G06T 19/006 |
| | | | 340/870.07 |
| 2016/0073342 A1* | 3/2016 | Szewczyk | H04W 52/0216 |
| | | | 370/311 |
| 2016/0228640 A1* | 8/2016 | Pindado | A61N 1/37282 |
| 2017/0289919 A1* | 10/2017 | Kurihara | H04W 52/241 |
| 2018/0123820 A1* | 5/2018 | Kim | H04L 12/2809 |
| 2018/0208448 A1* | 7/2018 | Zimmerman | G06K 7/1413 |
| 2019/0342297 A1* | 11/2019 | Adjaoute | G06N 5/043 |
| 2019/0368893 A1* | 12/2019 | Katayama | H04W 4/38 |
| 2020/0213830 A1* | 7/2020 | Zhao | H04W 76/14 |
| 2020/0322703 A1* | 10/2020 | Bures | G06N 20/00 |
| 2021/0014078 A1* | 1/2021 | Thompson | H04N 21/43615 |

* cited by examiner

RADIO FREQUENCY PROTOCOL FOR A SECURITY / AUTOMATION SYSTEM

FIELD

The present disclosure relates generally to security/automation systems and methods.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method of communications comprising receiving, by a multi-capability device from a control panel, a first message configured according to a protocol that defines a packet format configurable to indicate each queried capability of the multi-capability device. The method further includes transmitting, responsive to the first message querying a single capability of the multi-capability device, a second message from the multi-capability device to the control panel, wherein the second message includes a first packet configured according to the packet format to include a state or data value for the single capability of the multi-capability device. The method further includes transmitting, responsive to the first message querying at least two capabilities of the multi-capability device, a third message from the multi-capability device to the control panel, wherein the third message includes a second packet configured according to the packet format to include one state or data value for each one of the at least two capabilities of the multi-capability device.

Another example implementation includes an apparatus for communications comprising a memory and a processor communicatively coupled with the memory. The processor is configured to receive, by a multi-capability device from a control panel, a first message configured according to a protocol that defines a packet format configurable to indicate each queried capability of the multi-capability device. The processor is further configured to transmit, responsive to the first message querying a single capability of the multi-capability device, a second message from the multi-capability device to the control panel, wherein the second message includes a first packet configured according to the packet format to include a state or data value for the single capability of the multi-capability device. The processor is further configured to transmit, responsive to the first message querying at least two capabilities of the multi-capability device, a third message from the multi-capability device to the control panel, wherein the third message includes a second packet configured according to the packet format to include one state or data value for each one of the at least two capabilities of the multi-capability device.

Another example implementation includes an apparatus for communications comprising means for receiving, by a multi-capability device from a control panel, a first message configured according to a protocol that defines a packet format configurable to indicate each queried capability of the multi-capability device. The apparatus further comprises means for transmitting, responsive to the first message querying a single capability of the multi-capability device, a second message from the multi-capability device to the control panel, wherein the second message includes a first packet configured according to the packet format to include a state or data value for the single capability of the multi-capability device. The apparatus further comprises means for transmitting, responsive to the first message querying at least two capabilities of the multi-capability device, a third message from the multi-capability device to the control panel, wherein the third message includes a second packet configured according to the packet format to include one state or data value for each one of the at least two capabilities of the multi-capability device.

Another example implementation includes a computer-readable medium storing instructions for communications executable by a processor that, when executed, cause the processor to receive, by a multi-capability device from a control panel, a first message configured according to a protocol that defines a packet format configurable to indicate each queried capability of the multi-capability device. The instructions, when executed, further cause the processor to transmit, responsive to the first message querying a single capability of the multi-capability device, a second message from the multi-capability device to the control panel, wherein the second message includes a first packet configured according to the packet format to include a state or data value for the single capability of the multi-capability device. The instructions, when executed, further cause the processor to transmit, responsive to the first message querying at least two capabilities of the multi-capability device, a third message from the multi-capability device to the control panel, wherein the third message includes a second packet configured according to the packet format to include one state or data value for each one of the at least two capabilities of the multi-capability device.

A further example implementation includes a method of communications comprising transmitting, from a control panel to a multi-capability device, a first message configured according to a protocol that defines a packet format configurable to indicate each queried capability of the multi-capability device. The method further includes receiving, responsive to the first message querying a single capability of the multi-capability device, a second message by the control panel from the multi-capability device, wherein the second message includes a first packet configured according to the packet format to include a state or data value for the single capability of the multi-capability device. The method further includes receiving, responsive to the first message querying at least two capabilities of the multi-capability device, a third message by the control panel from the multi-capability device, wherein the third message includes a second packet configured according to the packet format to include one state or data value for each one of the at least two capabilities of the multi-capability device.

Another example implementation includes an apparatus for communications comprising a memory and a processor communicatively coupled with the memory. The processor is configured to transmit, from a control panel to a multi-capability device, a first message configured according to a protocol that defines a packet format configurable to indicate each queried capability of the multi-capability device. The processor is further configured to receive, responsive to the first message querying a single capability of the multi-capability device, a second message by the control panel from the multi-capability device, wherein the second message includes a first packet configured according to the packet format to include a state or data value for the single capability of the multi-capability device. The processor is further configured to receive, responsive to the first message querying at least two capabilities of the multi-capability device, a third message by the control panel from the multi-capability device, wherein the third message includes a second packet configured according to the packet format to include one state or data value for each one of the at least two capabilities of the multi-capability device.

Another example implementation includes an apparatus for communications comprising means for transmitting, from a control panel to a multi-capability device, a first message configured according to a protocol that defines a packet format configurable to indicate each queried capability of the multi-capability device. The apparatus further comprises means for receiving, responsive to the first message querying a single capability of the multi-capability device, a second message by the control panel from the multi-capability device, wherein the second message includes a first packet configured according to the packet format to include a state or data value for the single capability of the multi-capability device. The apparatus further comprises means for receiving, responsive to the first message querying at least two capabilities of the multi-capability device, a third message by the control panel from the multi-capability device, wherein the third message includes a second packet configured according to the packet format to include one state or data value for each one of the at least two capabilities of the multi-capability device.

Another example implementation includes a computer-readable medium storing instructions for communications executable by a processor that, when executed, cause the processor to transmit, from a control panel to a multi-capability device, a first message configured according to a protocol that defines a packet format configurable to indicate each queried capability of the multi-capability device. The instructions, when executed, further cause the processor to receive, responsive to the first message querying a single capability of the multi-capability device, a second message by the control panel from the multi-capability device, wherein the second message includes a first packet configured according to the packet format to include a state or data value for the single capability of the multi-capability device. The instructions, when executed, further cause the processor to receive, responsive to the first message querying at least two capabilities of the multi-capability device, a third message by the control panel from the multi-capability device, wherein the third message includes a second packet configured according to the packet format to include one state or data value for each one of the at least two capabilities of the multi-capability device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
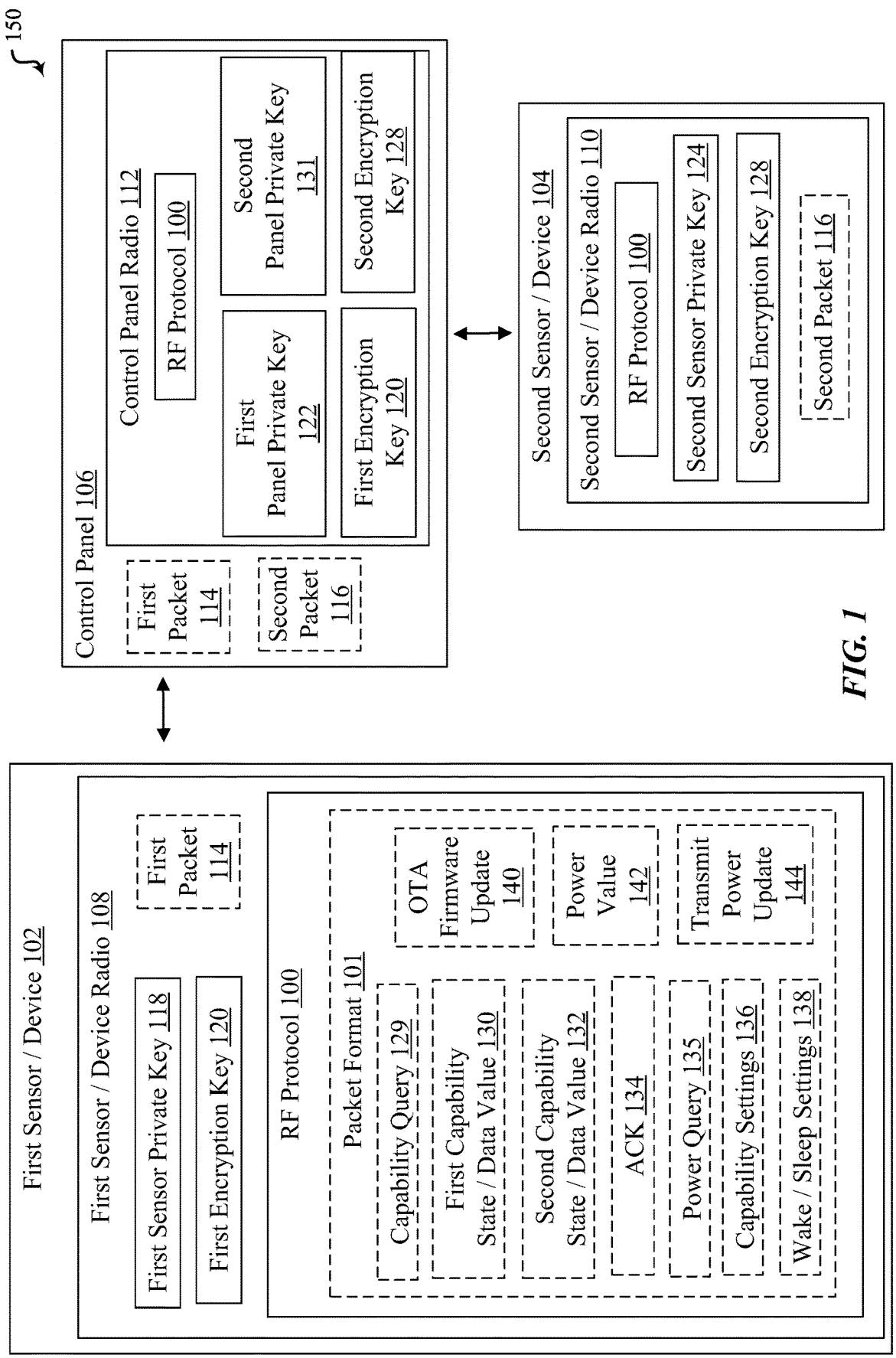
FIG. 1 is a schematic diagram of an example security/automation system including a control panel and one or more sensors/devices that each implement a radio-frequency (RF) protocol and radio, according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

Some present aspects provide a radio-frequency (RF) protocol and radio for a security/automation system. In one non-limiting aspect, for example, one or more sensors/devices in a premises security/automation system may implement an RF protocol and radio that provide flexible, encrypted, 2-way communication and improved range, while maintaining the price point and battery life of legacy sensors/devices.

For example, some legacy sensors/devices transmit at 319 MHz, 345 MHZ, and 433 MHz, and use one-way unencrypted communication with simple RF modulation (varying the carrier frequency waveform with a modulating waveform; carrier frequency is the frequency of the carrier waveform, which is modulated with an information-carrying waveform to transmit a message). Accordingly, these legacy sensors/devices use frequencies that have long wavelengths, thus requiring either large/long antennas or inefficient antennas. In some cases, for example, a small legacy sensor with inefficient antennas require a lot of wasted power in the RF transmitter, leading to lower battery life.

Because legacy sensors/devices use one-way communication, there is no guarantee that a message transmitted by a sensor/device is received by the control panel, and overthe-air firmware updates are also not possible. In some cases, redundant transmissions are required to mitigate RF collision, leading to lower battery life.

Further, the protocols implemented in legacy sensors/devices are limited, and legacy sensors/devices can only communicate limited states, such as, for example, door open/closed, temperature above/below a threshold, etc., but cannot communicate values, such as actual temperature, etc. For example, since a legacy temperature sensor cannot send the actual temperature and can only indicate if the temperature is above or below a threshold, the legacy temperature sensor may not be useful for controlling a heat, ventilation, and air conditioning (HVAC) system for example.

Moreover, federal communication commission (FCC) rules limit the transmit power of the sensors/devices to very low levels which limits link budget/range. On the other hand, the modulation technique implemented in legacy sensors/devices (e.g., on-off keying (OOK)) requires high signal to noise ratio (SNR) and transmitting each message multiple times for successful decoding at the receiver, which also limits the link budget/range. Since legacy sensors/devices have limited range and no flexibility, the installs often require using repeaters at additional cost, or using PowerG sensors/devices that provide better range by using high transmit power and frequency hopping (transmitting radio signals by switching the carrier frequency among several distinct frequency channels occupying a spectral band) but are significantly more expensive and have shorter battery life because the receiver of the sensor/device has high transmit power and has to be always on to listen to a coordinator for frequency hopping. Also, since PowerG uses high transmit power and requires a receiver that is always on for frequency hopping coordination, sensors/devices that implement PowerG have more power usage and may require a relatively larger battery.

In contrast, the present aspects provide an RF protocol and radio for automation/security system sensors/devices, where the RF protocol and radio support 2-way communication with a retry mechanism for reliable communication between sensors/devices and an automation/security control panel. In some aspects, the RF communication is encrypted (e.g., implementing advanced encryption standard-128 (AES-128) encryption), is operable to report both states and values, and is configured to support multi-capability sensors/devices. A multi-capability sensor/device is a sensor/device that is operable to provide more than one capability, such as more than one measurements (e.g., door/window displacement, temperature, smoke, etc.) or measurement types (e.g., temperature state and temperature value). In an aspect, the present RF protocol and radio allow for a control panel to enroll/register, configure, and communicate with a multi-capability sensor/device as a single endpoint. That is, using the present RF protocol and radio, the control panel registers the multi-capability sensor/device as one sensor/device (as opposed to multiple separately/registered sensors/devices), and all queried and/or reported state/value capability information may be included in one packet for communication between the control panel and the multi-capability device. As such, the present RF protocol and radio allow for less over-the-air traffic. The present RF protocol also allows for sensor/device settings to be configurable over-the-air, and for firmware updates of the sensors/devices to be implemented over-the-air.

Some aspects further provide low-power radio hardware for implementing the present RF protocol. In an aspect, the radio hardware may communicate at frequencies such as 915 MHZ/868 MHz, thus allowing for small, efficient antennas (e.g., compact ceramic antennas). In some aspects, for improved receiver sensitivity (the weakest signal power that a receiver can identify and process), the radio hardware implements an RF modulation such as offset quadrature phase shift keying (OQPSK), Gaussian frequency shift keying (GFSK, a modulation scheme in which pulses are shaped by a Gaussian filter before modulation), or 2-level GFSK (2GFSK, a modulation scheme in which information is transmitted through two distinct frequency changes, and pulses are shaped by a Gaussian filter before modulation), and/or direct sequence spread spectrum (DSSS, a modulation scheme in which the transmitted signal bandwidth is increased by a spreading factor (power in Hz is reduced by spreading factor) to decrease signal interference). In contrast to the modulation schemes used in legacy sensors/devices, such as OOK modulation that uses the two key parameters of amplitude and timing for modulation, the modulation schemes used in the present aspects use at least the four parameters of amplitude, phase, frequency, and timing. Accordingly, in comparison with the modulation schemes used in legacy sensors/devices, the modulation schemes used in the present aspects require lower SNR and therefore provide improved link budget/range. Further, by using the present modulation schemes, the receiver of a sensor/device may not need to be always on, and therefore the sensor/device may require a smaller battery size as compared to, for example, sensors/devices that implement frequency hopping accordingly to PowerG.

In one non-limiting aspect, for example, the radio may include a Silicon Labs Flex Gecko chipset. In one non-limiting aspect, for example, the chipset may have daughter card modularity when implemented on a security/automation system control panel.

Turning now to the figures, example aspects are depicted with reference to one or more components described herein, where components in dashed lines may be optional.

Referring to FIG. 1, a security/automation system 150 may include various sensors/devices 102, 104 (e.g., sensors, cameras, etc., installed throughout a premises) that communicate packets 114, 116 with a control panel 106 according to an RF protocol 100. Specifically, for example, a first sensor/device 102 may include a first sensor/device radio 108 operable according to the RF protocol 100 (which may be included in the firmware of the first sensor/device 102) to communicate with the control panel 106 that also includes a control panel radio 112 operable according to the RF protocol 100. Similarly, a second sensor/device 104 may also include a second sensor/device radio 110 operable according to the RF protocol 100 to communicate with the control panel 106. Further details of the sensors/devices 102, 104 and the control panel 106 are described with reference to various aspects below.

In an aspect, for example, the sensors/devices 102, 104 and the control panel 106 may implement two-way communication for reliable transport where every packet received by the control panel 106 or by a sensor/device 102, 104 (except for acknowledgment (ACK) packet types themselves) is acknowledged (ACKed), and packet transmission is retried if an ACK is not received within a timeout period.

In some aspects, the RF protocol 100 may define and support various packet types, such as a "Data" packet type, an "ACK" packet type, an "ACK+Data" packet type, etc. For example, in an aspect, in addition to using ACK packet types for acknowledging a packet, an "ACK+Data" packet type may be used for more conversational exchanges such as queries and their responses in order to reduce the number of packets that need to be sent. In some aspects, the "ACK"

packet type and the "ACK+Data" packet type may both be used in the enrollment process (e.g., see below).

In an aspect, the RF protocol 100 may defines a packet format 101 in which each packet includes a preamble, a header, a payload, and/or a cyclic redundancy check (CRC). In an aspect, the header of the packet indicates a packet type (e.g., as described above) and a payload type (e.g., as described below). In some aspects, the payload includes a packet identifier (ID) and payload data. The packet ID is used to identify packets so that the receiver can disregard duplicate packets that have been retransmitted and already successfully received. The payload data includes payload type for unique message identification. In some aspects, the packet ID is encrypted with the payload data in order to vary the payload and protect against man-in-the-middle attacks.

The payload type may be an indicator of any one of a number of protocol-specific messages, such as but not limited to: an enrollment request message, an enrollment device data message, a Diffie-Hellman message, a capabilities and settings request or reporting or enable/disable or update message (either specific one or all capabilities/settings), received signal strength indication and/or transmit power request and reporting messages, a request or reporting of attached device information, a firmware update message, an ACK message, a timeout confirmation message (e.g., from the control panel 106 when waiting to receive information or enrollment responses), a firmware update message, and/or an unenrollment request or response message. In one non-limiting aspect, attached device information may include data such as Electronic Serial Number (ESN), device type, firmware version (major and minor), etc. In an aspect, attached device information encompasses all of the payload data in the "Enrollment Request" packet. In an aspect, an unenrollment request or response message is configured to unenroll a multi-capability device that has been previously enrolled with the control panel 106.

Further, when a packet is an "ACK+Data" packet type, two Packet IDs are listed in the payload. For instance, one packet ID may be the ID of the packet it is included in, and the other packet ID is the ID of the packet being ACKed which was received previously.

In some aspects, the RF protocol 100 may define a format where the packet type also indicates whether or not another packet is to be expected, e.g., whether or not to stay awake.

In some aspects, if an ACK is not received for a packet, packet transmission is retried for a certain number of times, where the certain number of times may be specific to and configurable for each sensor/device. In some aspects, if a basic retry does not succeed, a subsequent retry may be attempted with increased transmit power. In some aspects, if a packet is received, the sensor/device may decrease the transmit power in order to find the minimum transmit power that supports a communication link that allows the control panel to continue to successfully receive packets from the sensor/device. As a result, transmitting at such a minimum transmit power saves battery power and increases battery lifetime. In an aspect, for example, the control panel may determine the signal strength from each sensor/device and instruct the sensor/device to increase or decrease the transmit power based on the signal strength detected at the control panel. Accordingly, the control panel may cause robust performance across different sensors/devices in an installation.

Some aspects may further implement Clear Channel Assessment (CCA) to avoid RF collisions. CCA implements a "listen-before-talk" mechanism where before attempting to transmit a packet, a sensor/device checks the channel to determine whether the channel is busy. If the channel is busy, there is a random back off period before the sensor/device attempts to transmit again. This decreases the chance that two sensors/devices will transmit at the same time.

In some aspects, using the present RF protocol and radio, a sensor/device may report states as well as values. In one non-limiting aspect, for example, a sensor/device may provide a temperature state report (e.g., may report that temperature is above a threshold), a temperature value report (e.g., may report that temperature is 38.7° C.), a battery state report (e.g., may report low battery), a battery value report (e.g., may report that the battery voltage is 2853 mV), etc.

In some aspects, the present RF protocol and radio may be implemented in a multi-capability sensor/device, such as a sensor/device that includes a door/window displacement sensor and a temperature sensor (e.g., reporting a door/window state as well as a temperature value), a smoke/carbon monoxide (CO)/heat detector (e.g., reporting smoke state, CO state, heat state, CO ppm value, and temperature value), etc. In an aspect, the multi-capability sensor/device may indicate its multiple capabilities (send a description of its capabilities) to the control panel during sensor/device enrollment, so that the control panel knows what data to expect from the sensor/device and what data may be queried from the sensor/device. In an aspect, for example, the control panel may enable/disable one or more capabilities of the multi-capability sensor/device. In an aspect, for example, the control panel may save battery life of the sensor/device by disabling one or more capabilities. In another aspect, for example, the control panel may query individual capabilities or may query a list of capabilities of the multi-capability sensor/device. Such query functionality is applicable, for example but not limited to, automation devices where the control panel requires high responsiveness from a sensor/device.

In some aspects, the RF protocol 100 allows for secure encrypted communication. For example, but not limited hereto, the communication between the sensor/device and the control panel may be AES-encrypted, where the encryption key is derived from a Diffie-Hellman key exchange (e.g., FIG. 2 below). Specifically, the control panel and the sensor/device have individual secret keys that are not shared publicly. The control panel and the sensor/device each use their respective secret key and a common public to obtain a respective public key for a public exchange where the receiver does not know the private key used to obtain the public key. Each receiver then uses the received public key and its own private key to obtain a same secret key. Because the common secret is derived by operations that are not reversible, the control panel and the sensor/device may separately derive a common secret key without sharing any information that could be used by an adversary to determine the secret key. In some aspects, the hardware platform in the sensor/device includes a hardware acceleration engine that allows for implementing the above for robust security.

In an aspect, using an enrollment process, a new sensor/device may be paired with the control panel. During the enrollment process, the new sensor/device and the control panel exchange the required information in order to be able to address each other and have the encryption keys to encrypt and decrypt messages for encrypted communication. In an aspect, the control panel issues a separate key for each sensor/device that is enrolled with the control panel. The control panel stores all of the keys for the enrolled sensors/device, and each sensor/device stores its own key. In an aspect, the key information stored on the control panel may be backed up in a server on a network (e.g., the cloud), and if the control panel is replaced with a new control panel, the keys may be downloaded and restored to the new control panel from the cloud. Accordingly, the new control panel has access to all the encryption keys, and therefore the sensors/devices do not need to be re-enrolled with the new control panel. This is advantageous, for example, in large installation with many sensors/devices, since an installer would not need to walk through the installation and open each sensor/device for re-enrollment.

Figure 2:
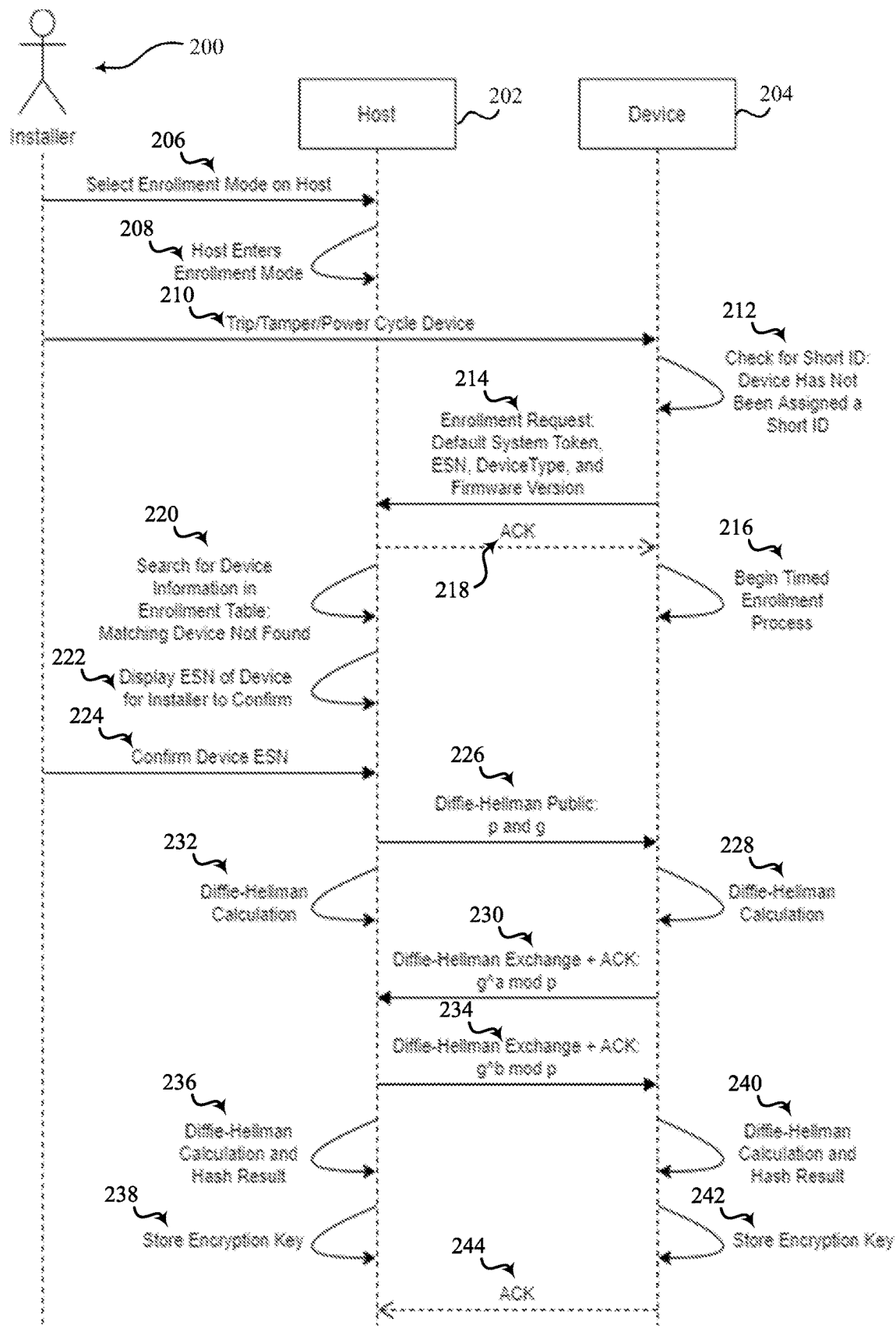
FIG. 2 is an example message sequence diagram for enrollment of a sensor/device in FIG. 1, according to some aspects.

Referring to FIG. 2, in an aspect, for example, an installer 200 may interact with a host 202 (e.g., a control panel a security/automation system of a premises) to enroll a new sensor/device 204 that is added to an installation. At 206 the installer selects the enrollment mode on the host 202, for example, via a user interface of the host 202. In response, the host 202 enters the enrollment mode at 208. Then, at 210 the installer 200 performs a trip/tamper/power cycle on the device 204. In response, at 212 the device 204 looks for a short ID. If it is determined that the device 204 has not been assigned a short ID, at 214 the device 204 sends an enrollment request to the host 202 and begins a timed enrollment process at 216. In an aspect, the enrollment request may indicate one or more of a default system token, an electronic serial number (ESN), device type, firmware version, etc. In some aspects, the device type may indicate the device as being a type such as, but not limited to, a security type of device (e.g., video, glass break, tilt, shock, image, motion, door/window contact, fob), a life safety type of device (e.g., smoke, heat, panic, carbon monoxide, flood), and/or a lifestyle type device (e.g., smart socket, dimmer, light, doorbell, outlet).

Upon receiving the enrollment request, at 218 the host 202 sends an ACK to the device 204, and at 220 the host 202 searches for device information in an enrollment table. If a matching device is not found in the enrollment table, at 222 the host 202 displays (e.g., via a user interface of the host 202) the ESN of the device 204 for the installer 200 to confirm. At 224 the installer 200 confirms the device ESN (e.g., via a user interface of the host 202). Then, the host 202 and the device 204 perform a key exchange, such as a Diffie-Hellman key exchange, to derive a common key for encrypted communication that is only understood by the host 202 and the device 204.

Specifically, at 226 the host 202 sends a Diffie-Hellman public to the device 204. The Diffie-Hellman public includes a public (prime) base "g" and a public (prime) modulus "p." At 238 the device 204 uses its private key "a" to perform the Diffie-Hellman calculation "g^a mod p" that provides a device public key "A," and sends the device public key "A" with an ACK to the host 202 at 232. In response, the host 202 who at 232 has also used its private key "b" to perform the Diffie-Hellman calculation "g^b mod p" that provides a host public key "B," sends the host public key "B" along with an ACK to the device 204 at 234. At 236 the host 202 again uses its private key "b" to perform the Diffie-Hellman calculation "B^a mod p" that provides the common secret key "s," and the host 202 stores the common secret "s" at 238. Further, at 240 the device 204 uses its private key "a" to perform the Diffie-Hellman calculation "A^b mod p" that provides the same common secret key "s" as calculated by the host 202. At 242 the device 204 stores the common secret "s," and at 244 the device 204 sends an ACK to the host 202, which concludes the key exchange.

Accordingly, unlike other protocols where one key is used for an entire network, the present aspects provide an enrollment process to establish an encryption key that is unique between each sensor/device and the control panel. In one non-limiting aspect, for example, the packets communicated between the control panel and a sensor/device are AES-128 encrypted according to Diffie-Hellman encryption.

In some aspects, a sensor/device may indicate a unique device ID and one or more capabilities of the sensor/device to the control panel, and the control panel may set which capabilities of the sensor/device are active or disabled. In an aspect, each capability of the sensor/device has its own configurable settings, and the control panel may program those settings on the sensor/device.

In some aspects, the RF protocol defines programmable settings. For example, for each capability of a multi-capability sensor/device, the RF protocol may provide unique programmable settings that are programmable by the control panel, and the control panel may also query the values of such settings from the sensor/device. For instance, the RF protocol may define a packet format having a packet type that indicates the packet is a capabilities and settings request packet or a capabilities and settings reporting packet, wherein a payload is formatted to indicate the number of capability types and the associated settings. In an aspect, for example, the RF protocol may provide unique programmable settings for temperature threshold (e.g., for indicating when a temperature is out of acceptable bounds), noise level threshold (e.g., a party/crowd detector), voltage for low battery warning (or different levels of warnings such as low battery, replace battery soon, urgent—replace battery), etc. In an alternative or additional aspect, the RF protocol may also provide unique programmable settings for number of retries, length of supervisory interval, and transmit power, and such settings are programmable by the control panel. In another alternative or additional aspect, the RF protocol may also provide unique programmable settings for configurable wake/sleep behavior of a sensor/device. Such settings may allow for various configurable wake/sleep behavior options, and different sensors/devices may have different sleep behavior which is configurable. For example, the settings may allow for configuring a device/sensor into an always-listening device (for AC powered sensors/devices such as home automation devices that do not have battery life constraints and therefore can always be on and listening), a semi-sleeping device (to conserve power while also being responsive to queries/command, optionally with a configurable wake-up period), a full-sleepy device (to conserve maximum power by only waking up when there is a packet to transmit (e.g., a status/supervisory/heartbeat message) and wait for a short period of time after transmitting to listen to the panel (e.g., to receive an ACK or a query for more information), and programming the supervisory interval of these sensors/devices impacts sensor/device responsiveness (e.g., 200 seconds)), a schedule wake up device (e.g., an NB-IoT device that periodically wakes up for a short duration according to a configured schedule) etc.

In one non-limiting aspect, for example, a sensor/device may be programmed into a semi-sleeping mode such that the radio of the sensor/device wakes up in response to a specific event such as receiving a specific packet (e.g., a low level packet such as an OOK packet that the sensor can easily recognize in a low power state), and after the sensor is awake, the control panel may communicate with the sensor using regular packets. In an alternative non-limiting aspect, for example, a sensor/device may be programmed into a preamble sense mode such that the sensor/device is in a low energy state and senses the preamble of a packet before waking up to receive the packet.

In some aspects, some devices such as smoke detectors may be subject to certifications that prevent from configuring the sensor/device into a deep sleep. For these sensors/ devices, some aspects define a more awake sleep state that does not invalidate the required certifications.

As described, the present aspects allow for flexible, encrypted, 2-way communication and improved range, while maintaining the price point and battery life of legacy sensors/devices. For example, in one non-limiting example implementation, a door/window displacement sensor according to the present aspects may be implemented at a same/similar cost as a legacy sensor/device, and a size of 1.83"×0.87"×0.4", with an estimated link budget/range of 1150 ft, one 130 mAh CR1632 battery providing an estimated battery life of 6-7 years, a radio transmit power of −10 dBm, a sensor antenna gain of −4 dBi, and a receiver sensitivity of −110 dBm.

In one non-limiting example implementation, a sensor/ device configured with the RF protocol and radio according to the present aspects may send and receive packets, participate in an enrollment process (e.g., as described above using a simplified Diffie-Hellman key exchange), and perform address filtering and packet ID filtering. The sensor/ device may implement a media access control (MAC) protocol such as carrier-sense multiple access with collision avoidance (CSMA/CA), and may be configured to send ACK packets as well as ACK plus data packets. For packets that are not successfully communicated, the sensor/device may perform packet transmission retries. The sensor/device may store configuration registers, capabilities, and settings in a nonvolatile memory of the sensor/device. The sensor/ device may read from and write to the nonvolatile memory from the firmware of the sensor/device. For example, the sensor/device may include a third generation non-volatile memory (NVM3), implement custom tokens, and write default values to the tokens and the NVM3 using a command line tool such as Simplicity Commander. In one non-limiting aspect, the sensor/device may enter EM4 wakeup mode, and use the CRYOTIMER to wake up. The sensor/device may use a general purpose input output (GPIO) for polling. In one non-limiting implementation, for example, such a sensor/device may include Reed switch functionality to implement a door/window displacement detector.

Figure 3:
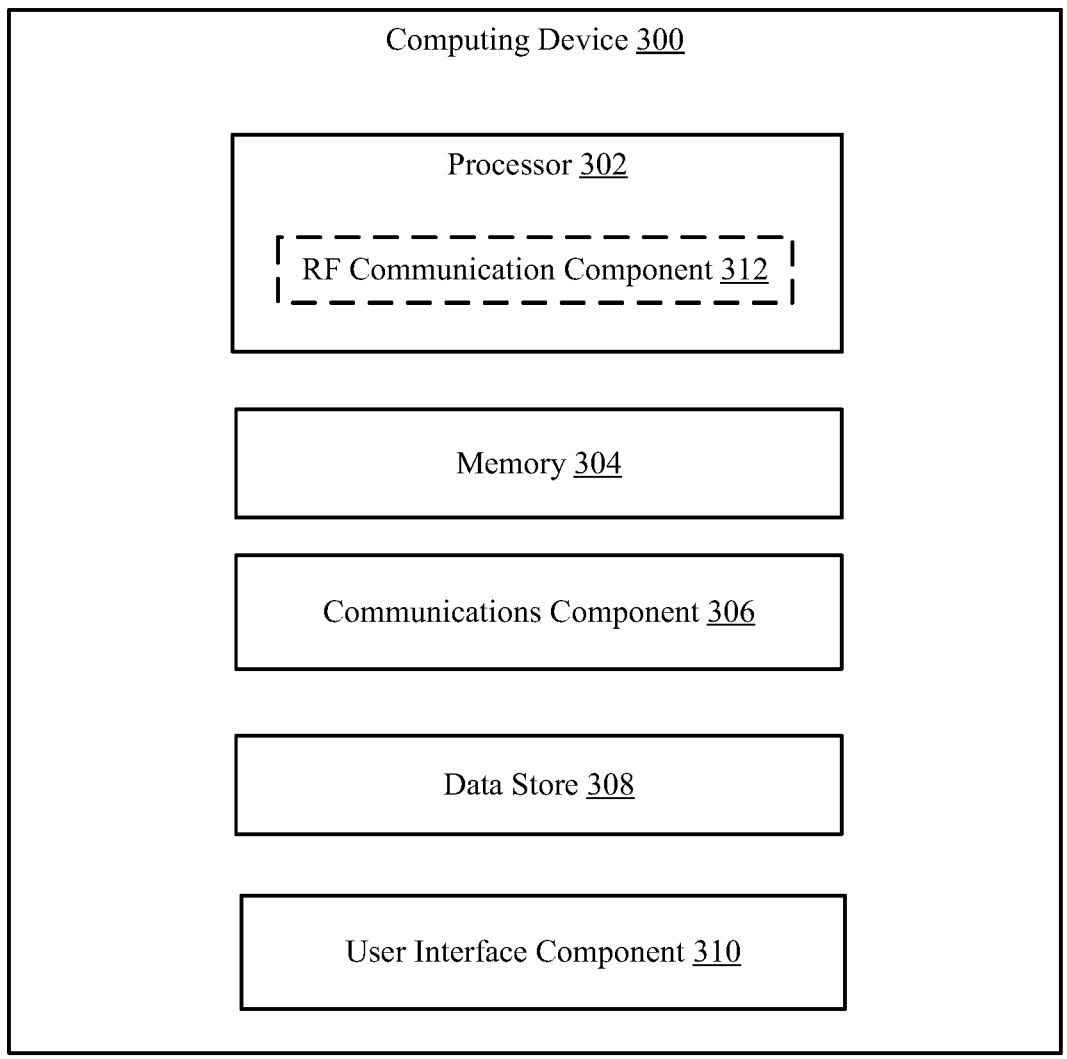
FIG. 3 is a block diagram of an example computing device which may implement all or a portion of any component in FIG. 1, according to some aspects.
Figure 4:
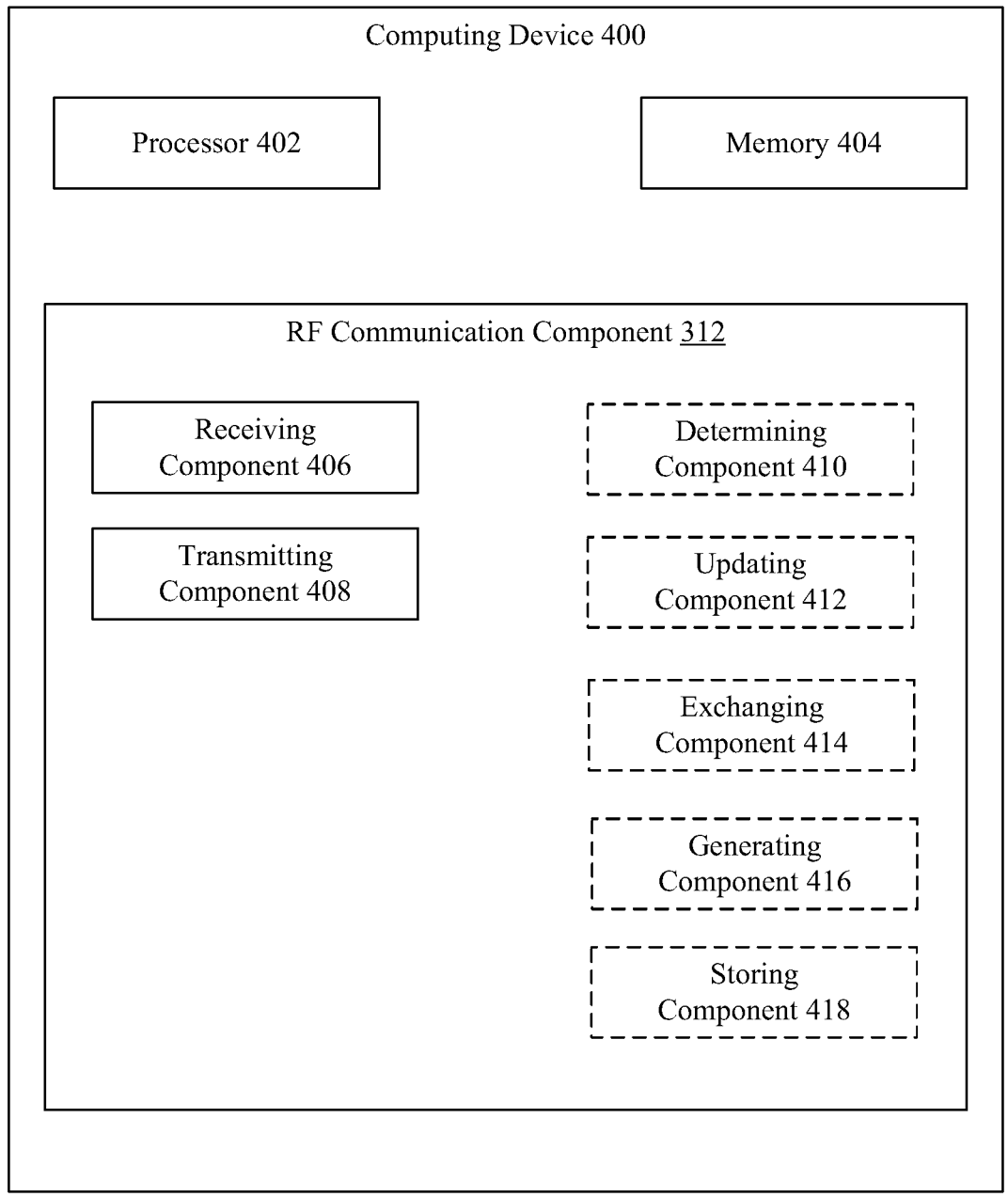
FIG. 4 is a block diagram of example components of a computing device which may implement all or a portion of a control panel or a sensor/device in FIG. 1 configured for RF communication, according to some aspects.

FIG. 3 illustrates an example block diagram providing details of computing components in a computing device 300 that may implement all or a portion of one or more components in a control panel, a sensor/device, or any other component described above. The computing device 300 includes a processor 302 which may be configured to execute or implement software, hardware, and/or firmware modules that perform any functionality described above with reference to one or more components in a control panel, a sensor/device, or any other component described above. For example, the processor 302 may be configured to execute an RF communication component 312 to provide RF communication functionality, as described herein with reference to various aspects.

The processor 302 may be a micro-controller and/or may include a single or multiple set of processors or multi-core processors. Moreover, the processor 302 may be implemented as an integrated processing system and/or a distributed processing system. The computing device 300 may further include a memory 304, such as for storing local versions of applications being executed by the processor 302, related instructions, parameters, etc. The memory 304 may include a type of memory usable by a computer, such as random access memory (RAM), read only memory (ROM), tapes, flash drives, magnetic discs, optical discs, volatile memory, non-volatile memory, and any combination thereof. Additionally, the processor 302 and the memory 304 may include and execute an operating system executing on the processor 302, one or more applications, display drivers, etc., and/or other components of the computing device 300.

Further, the computing device 300 may include a communications component 306 that provides for establishing and maintaining communications with one or more other devices, parties, entities, etc., utilizing hardware, software, and services. The communications component 306 may carry communications between components on the computing device 300, as well as between the computing device 300 and external devices, such as devices located across a communications network and/or devices serially or locally connected to the computing device 300. For example, the communications component 306 may include one or more buses, and may further include transmit chain components and receive chain components associated with a wireless or wired transmitter and receiver, respectively, operable for interfacing with external devices.

Additionally, the computing device 300 may include a data store 308, which can be any suitable combination of hardware and/or software, that provides for mass storage of information, databases, and programs. For example, the data store 308 may be or may include a data repository for applications and/or related parameters not currently being executed by the processor 302. In addition, the data store 308 may be a data repository for an operating system, application, display driver, etc., executing on the processor 302, and/or one or more other components of the computing device 300.

The computing device 300 may also include a user interface component 310 operable to receive inputs from a user of the computing device 300 and further operable to generate outputs for presentation to the user (e.g., via a display interface to a display device). The user interface component 310 may include one or more input devices, including but not limited to a keyboard, a number pad, a mouse, a touch-sensitive display, a navigation key, a function key, a microphone, a voice recognition component, or any other mechanism capable of receiving an input from a user, or any combination thereof. Further, the user interface component 310 may include one or more output devices, including but not limited to a display interface, a speaker, a haptic feedback mechanism, a printer, any other mechanism capable of presenting an output to a user, or any combination thereof.

Referring to FIGS. 4-10, in operation for RF communication functionality, computing device 400 may implement at least a portion of one or more components in FIGS. 1-3 above, such as all or at least a portion of the first sensor/ device 102, the second sensor/device 104, or the control panel 106 in FIG. 1, and may perform method 500 or method 600 such as via execution of RF communication component 312 by processor 402 and/or memory 404. Specifically, computing device 400 may be configured to perform method 500 for performing an aspect of RF communication functionality by a sensor/device, as described herein. Further, computing device 400 may be configured to perform method 600 for performing an aspect of RF communication functionality by a control panel, as described herein. It should be noted that computing device 400, processor 402, and memory 404 may be the same or similar to computing device 300, processor 302, and memory 304 as described above with respect to FIG. 3.

The below description of method 500 begins with optional blocks 502, 504, 506, and 508, which may be optionally performed prior to block 510.

Figure 5:
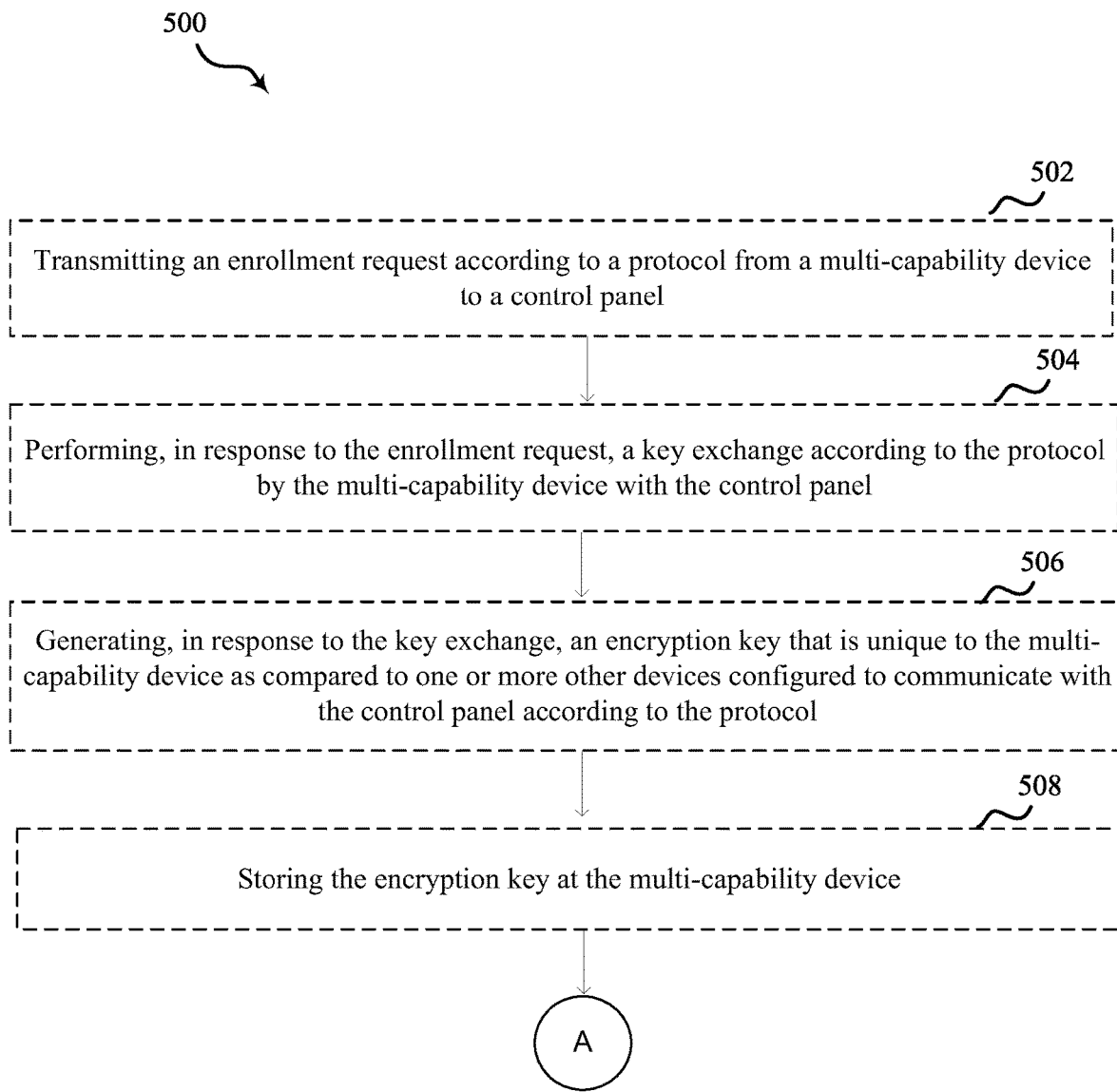
FIG. 5 is a flow diagram of a first example method for RF communication by a sensor/device in FIG. 1, according to some aspects.

Referring to FIG. 5, in one optional implementation, at block 502, the method 500 may include transmitting an enrollment request according to a protocol from a multi-capability device to a control panel. For example, in an aspect, computing device 400, processor 402, memory 404, RF communication component 312, and/or transmitting component 408 may be configured to or may comprise means for transmitting an enrollment request according to a protocol from a multi-capability device to a control panel.

For example, in an aspect, the transmitting at block 502 may include the first sensor/device 102 executing the transmitting component 408 to transmit an enrollment request according to the RF protocol 100 to the control panel 106, for example, as described herein with reference to block 214 in FIG. 2. In an aspect, the first sensor/device 102 is a multi-capability sensor/device, which is a sensor/device that is operable to provide more than one capability, such as more than one measurement (e.g., door/window displacement, temperature, smoke, etc.) and/or more than one measurement type (e.g., temperature state and temperature value). In an aspect, using an enrollment process, a new sensor/device may be paired with the control panel. During the enrollment process, the new sensor/device and the control panel exchange the required information in order to be able to address each other and have the encryption keys to encrypt and decrypt messages for encrypted communication.

In one optional implementation, at block 504, the method 500 may include performing, in response to the enrollment request, a key exchange according to the protocol by the multi-capability device with the control panel. For example, in an aspect, computing device 400, processor 402, memory 404, RF communication component 312, and/or exchanging component 414 may be configured to or may comprise means for performing, in response to the enrollment request, a key exchange according to the protocol by the multi-capability device with the control panel.

For example, in one non-limiting aspect, the exchanging at block 504 may include the first sensor/device 102 executing the exchanging component 414 to perform, in response to the enrollment request, a Diffie-Hellman key exchange according to the RF protocol 100 with the control panel 106, for example, as described above with reference to blocks 226, 230, and 234 in FIG. 2.

In one optional implementation, at block 506, the method 500 may include generating, in response to the key exchange, an encryption key that is unique to the multi-capability device as compared to one or more other devices configured to communicate with the control panel according to the protocol. For example, in an aspect, computing device 400, processor 402, memory 404, RF communication component 312, and/or generating component 416 may be configured to or may comprise means for generating, in response to the key exchange, an encryption key that is unique to the multi-capability device as compared to one or more other devices configured to communicate with the control panel according to the protocol.

For example, in an aspect, the generating at block 506 may include the first sensor/device 102 executing the generating component 416 to generate, in response to the key exchange, an encryption key that is unique to the first sensor/device 102 as compared to the second sensor/device 104 that is also configured to communicate with the control panel according to the RF protocol 100, for example, as described above with reference to a Diffie-Hellman key exchange at blocks 228 and 240 in FIG. 2. For example, the first sensor/device 102 and the control panel 106 may perform a key exchange according to FIG. 2. During the key exchange, the first sensor/device 102 and the control panel 106 may use the first sensor private key 118 that is only known to the first sensor/device 102 and the first panel private key 122 that is only known to the control panel 106 to separately derive the first encryption key 120 for encrypted communication of the first packet 114 between the first sensor/device 102 and the control panel 106. The first encryption key 120 is unique to the first sensor/device 102 as compared to other devices that communicate with the control panel 106, such as the second sensor/device 104. In fact, the second sensor/device 104 and the control panel 106 may also perform a key exchange according to FIG. 2. During the key exchange, the second sensor/device 104 and the control panel 106 may use the second sensor private key 124 that is only known to the second sensor/device 104 and the second panel private key 131 that is only known to the control panel 106 to separately derive the second encryption key 128 for encrypted communication of the second packet 116 between the second sensor/device 104 and the control panel 106. The second encryption key 128 is unique to the second sensor/device 104 as compared to other devices that communicate with the control panel 106, such as the first sensor/device 102.

In one optional implementation, at block 508, the method 500 may include storing the encryption key at the multi-capability device. For example, in an aspect, computing device 400, processor 402, memory 404, RF communication component 312, and/or storing component 418 may be configured to or may comprise means for storing the encryption key at the multi-capability device.

For example, in an aspect, the storing at block 508 may include the first sensor/device 102 executing the storing component 418 to store the first encryption key 120, e.g., at the memory 404 of the first sensor/device 102, for example, as described above with reference to block 242 in FIG. 2.

Figure 6:
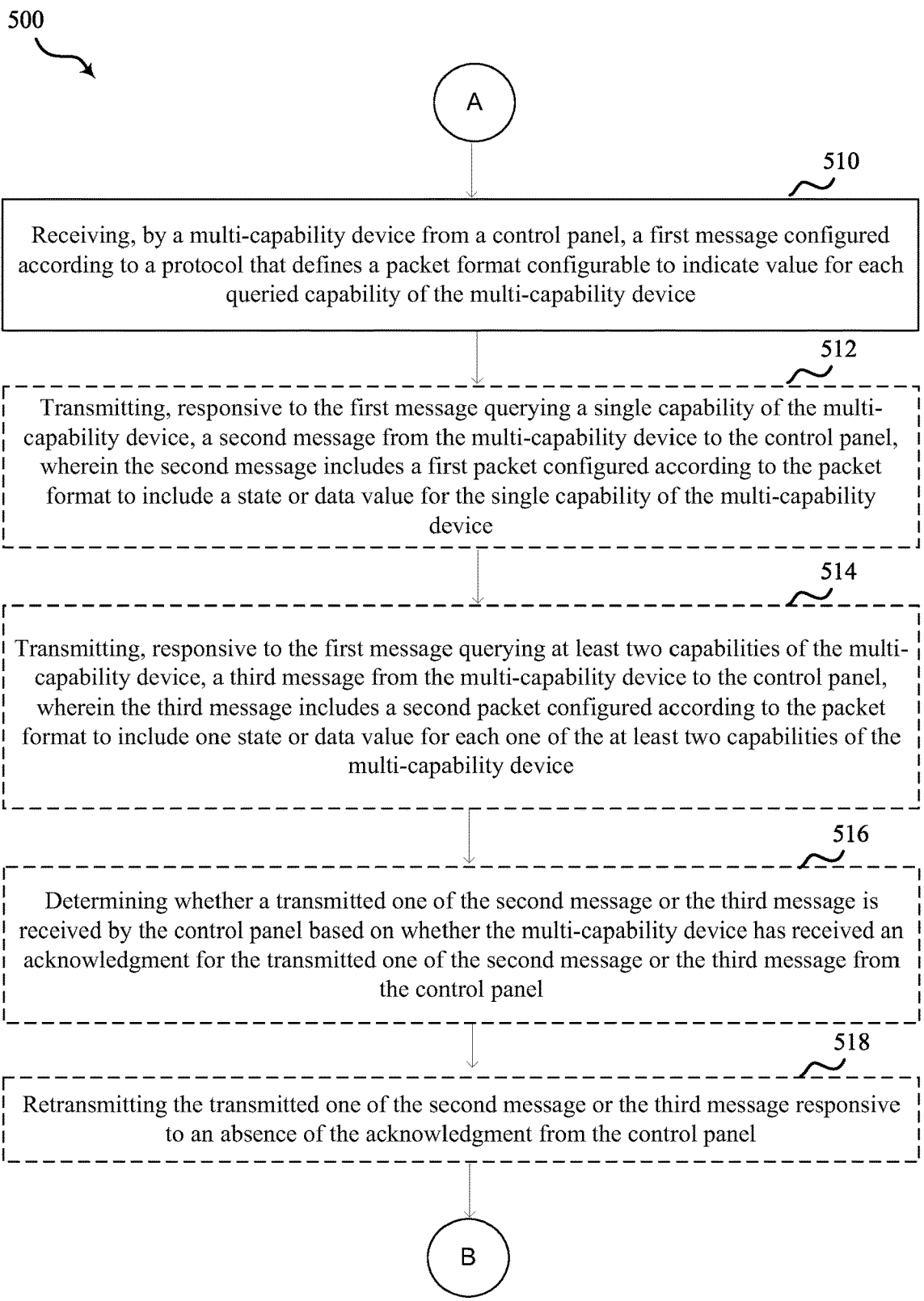
FIG. 6 is a flow diagram of a second example method for RF communication by a sensor/device in FIG. 1, according to some aspects.

Continuing to FIG. 6, at block 510, the method 500 includes receiving, by a multi-capability device from a control panel, a first message configured according to a protocol that defines a packet format configurable to indicate each queried capability of the multi-capability device. For example, in an aspect, computing device 400, processor 402, memory 404, RF communication component 312, and/or receiving component 406 may be configured to or may comprise means for receiving, by a multi-capability device from a control panel, a first message configured according to a protocol that defines a packet format configurable to indicate each queried capability of the multi-capability device.

For example, in an aspect, the receiving at block 510 may include the first sensor/device 102 executing the receiving component 406 to receive, from the control panel 106, a message including a packet that is configured according to the RF protocol 100 that defines a packet format 101 configurable to indicate each/every queried capability of the first sensor/device 102. In one optional implementation, for example, the control panel 106 may specify one or more capabilities for the multi-capability device to respond with the corresponding capability data values/states. For example, the control panel 106 may specify the capability type (e.g., a value corresponding to a specific capability) that the control panel 106 is querying the multi-capability device for. In an alternative optional implementation, for example, the control panel 106 may send a message where no capabilities are specified, but the payload type of the message indicates that the control panel 106 is querying all of the capabilities of the multi-capability device.

In one optional implementation, at block 512, the method 500 may include transmitting, responsive to the first message querying a single capability of the multi-capability device, a second message from the multi-capability device to the control panel, wherein the second message includes a first packet configured according to the packet format to include a state or data value for the single capability of the multi-capability device.

For example, in an aspect, computing device 400, processor 402, memory 404, RF communication component 312, and/or transmitting component 408 may be configured to or may comprise means for transmitting, responsive to the first message querying a single capability of the multi-capability device, a second message from the multi-capability device to the control panel, wherein the second message includes a first packet configured according to the packet format to include a state or data value for the single capability of the multi-capability device.

For example, in an aspect, the transmitting at block 512 may include the first sensor/device 102 executing the transmitting component 408 to transmit, responsive to receiving a query message querying a single capability of the first sensor/device 102, a response message to the control panel 106, wherein the response message includes a packet configured according to the packet format 101 to include a state or data value for the queried capability of the first sensor/device 102. For example, in an aspect, if the first sensor/device 102 receives a packet from the control panel 106 that is configured according to the packet format 101 to include a capability query 129 for only one of the multiple capabilities of the first sensor/device 102, then the first sensor/device 102 responds to the control panel 106 by sending a packet configured according to the packet format 101 to include a first capability state/data value 130 for the queried capability of the first sensor/device 102 (e.g., a temperature state such as "temperature above threshold," or a temperature value such as "70 degrees"). In one optional implementation, for example, the control panel 106 may specify a single capability for the multi-capability device to respond with the corresponding capability data value/state. For example, the control panel 106 may specify a single capability type (e.g., a value corresponding to a specific capability) that the control panel 106 is querying the multi-capability device for.

In one optional implementation, at block 514, the method 500 may include transmitting, responsive to the first message querying at least two capabilities of the multi-capability device, a third message from the multi-capability device to the control panel, wherein the third message includes a second packet configured according to the packet format to include one state or data value for each one of the at least two capabilities of the multi-capability device. For example, in an aspect, computing device 400, processor 402, memory 404, RF communication component 312, and/or transmitting component 408 may be configured to or may comprise means for transmitting, responsive to the first message querying at least two capabilities of the multi-capability device, a third message from the multi-capability device to the control panel, wherein the third message includes a second packet configured according to the packet format to include one state or data value for each one of the at least two capabilities of the multi-capability device.

For example, in an aspect, the transmitting at block 514 may include the first sensor/device 102 executing the transmitting component 408 to transmit, responsive to receiving a query message querying at least two capabilities of the first sensor/device 102, a response message to the control panel 106, wherein the response message includes a packet configured according to the packet format 101 to include one state or data value for each one of the queried capabilities of the first sensor/device 102. For example, in an aspect, if the first sensor/device 102 receives a packet from the control panel 106 that is configured according to the packet format 101 to include a capability query 129 that queries a first as well as a second capability of the first sensor/device 102, then the first sensor/device 102 responds to the control panel 106 by sending a packet configured according to the packet format 101 to include a first capability state/data value 130 for the first queried capability of the first sensor/device 102 (e.g., a temperature state such as "temperature above threshold") as well as a second capability state/data value 132 for the second queried capability of the first sensor/device 102 (e.g., a temperature value such as "70 degrees"). In one optional implementation, for example, the control panel 106 may specify multiple capabilities for the multi-capability device to respond with the corresponding capability data values/states. For example, the control panel 106 may specify multiple capability types (e.g., multiple values corresponding to respective capabilities) that the control panel 106 is querying the multi-capability device for. In an alternative optional implementation, for example, the control panel 106 may send a message where no capabilities are specified, but the payload type of the message indicates that the control panel 106 is querying all of the capabilities of the multi-capability device.

In one optional implementation, at block 516, the method 500 may include determining whether a transmitted one of the second message or the third message is received by the control panel based on whether the multi-capability device has received an acknowledgment for the transmitted one of the second message or the third message from the control panel. For example, in an aspect, computing device 400, processor 402, memory 404, RF communication component 312, and/or determining component 410 may be configured to or may comprise means for determining whether a transmitted one of the second message or the third message is received by the control panel based on whether the multi-capability device has received an acknowledgment for the transmitted one of the second message or the third message from the control panel.

For example, in an aspect, the determining at block 516 may include the first sensor/device 102 executing the determining component 410 to determine whether a message transmitted by the first sensor/device 102 is received by the control panel 106, based on whether the first sensor/device 102 has received an acknowledgment for the transmitted message from the control panel 106. For example, in an aspect, the packet format 101 allows for the control panel 106 to configure and transmit a packet that includes an ACK 134 for each packet received from the first sensor/device 102, and the first sensor/device 102 may look for such ACK 134 from the control panel 106 after transmitting each packet to the control panel 106.

In one optional implementation, at block 518, the method 500 may include retransmitting the transmitted one of the second message or the third message responsive to an absence of the acknowledgment from the control panel. For example, in an aspect, computing device 400, processor 402, memory 404, RF communication component 312, and/or transmitting component 408 may be configured to or may comprise means for retransmitting the transmitted one of the second message or the third message responsive to an absence of the acknowledgment from the control panel.

For example, in an aspect, the re-transmitting at block 518 may include the first sensor/device 102 executing the transmitting component 408 to retransmit a previously transmitted packet when an ACK 134 is not received from the control panel 106 for the previously transmitted packet.

In one optional implementation, each message communicated between the first sensor/device 102 and the control panel 106 is encrypted using the first encryption key 120 that is unique to the first sensor/device 102 as compared to one or more other devices configured to communicate with the control panel 106 according to the RF protocol 100, such as the second sensor/device 104. Similarly, each message communicated between the second sensor/device 104 and the control panel 106 is encrypted using the second encryption key 128 that is unique to the second sensor/device 104 as compared to one or more other devices configured to communicate with the control panel 106 according to the RF protocol 100, such as the first sensor/device 102.

Figure 7:
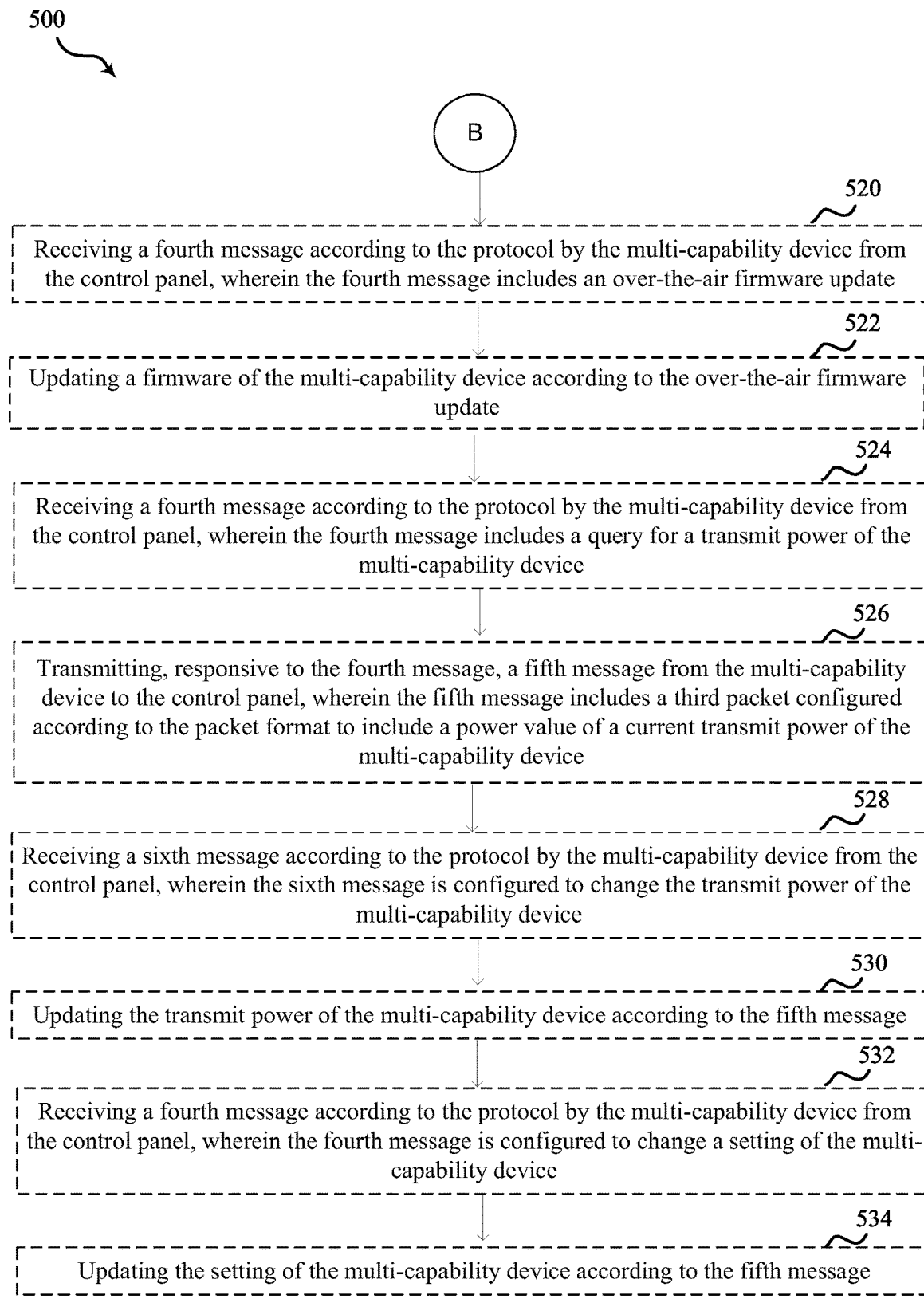
FIG. 7 is a flow diagram of a third example method for RF communication by a sensor/device in FIG. 1, according to some aspects.

Continuing to FIG. 7, in one optional implementation, at block 520, the method 500 may include receiving a fourth message according to the protocol by the multi-capability device from the control panel, wherein the fourth message includes an over-the-air firmware update. For example, in an aspect, computing device 400, processor 402, memory 404, RF communication component 312, and/or receiving component 406 may be configured to or may comprise means for receiving a fourth message according to the protocol by the multi-capability device from the control panel, wherein the fourth message includes an over-the-air firmware update.

For example, in an aspect, the receiving at block 520 may include the first sensor/device 102 executing the receiving component 406 to receive a message according to the RF protocol 100 from the control panel 106, wherein the message includes a packet configured according to the packet format 101 to include an over-the-air firmware update 140 for the first sensor/device 102.

In one optional implementation, at block 522, the method 500 may include updating a firmware of the multi-capability device according to the over-the-air firmware update. For example, in an aspect, computing device 400, processor 402, memory 404, RF communication component 312, and/or updating component 412 may be configured to or may comprise means for updating a firmware of the multi-capability device according to the over-the-air firmware update.

For example, in an aspect, the updating at block 522 may include the first sensor/device 102 executing the updating component 412 to update a firmware of the first sensor/device 102 according to the over-the-air firmware update 140 received from the control panel 106 in a packet configured according to the packet format 101.

In one optional implementation, at block 524, the method 500 may include receiving a fourth message according to the protocol by the multi-capability device from the control panel, wherein the fourth message includes a query for a transmit power of the multi-capability device. For example, in an aspect, computing device 400, processor 402, memory 404, RF communication component 312, and/or receiving component 406 may be configured to or may comprise means for receiving a fourth message according to the protocol by the multi-capability device from the control panel, wherein the fourth message includes a query for a transmit power of the multi-capability device.

For example, in an aspect, the receiving at block 524 may include the first sensor/device 102 executing the receiving component 406 to receive a message according to the RF protocol 100 from the control panel 106, wherein the message includes a packet configured according to the packet format 101 to include a power query 135 to query a current transmit power of the first sensor/device 102. In one optional implementation, for example, a multi-capability device (e.g., the first sensor/device 102) may keep track of the minimum, maximum, average, and most recent packet received signal strength indicator (RSSI) values. In these implementations, one or more of these values may be queried/requested by the control panel 106, and the control panel 106 may also request to reset one or more of these values (e.g., reset the running average).

In one optional implementation, at block 526, the method 500 may include transmitting, responsive to the fourth message, a fifth message from the multi-capability device to the control panel, wherein the fifth message includes a third packet configured according to the packet format to include a power value of a current transmit power of the multi-capability device. For example, in an aspect, computing device 400, processor 402, memory 404, RF communication component 312, and/or transmitting component 408 may be configured to or may comprise means for transmitting, responsive to the fourth message, a fifth message from the multi-capability device to the control panel, wherein the fifth message includes a third packet configured according to the packet format to include a power value of a current transmit power of the multi-capability device.

For example, in an aspect, the transmitting at block 526 may include the first sensor/device 102 executing the transmitting component 408 to transmit a message to the control panel 106 responsive to a query from the control panel 106 for a current transmit power of the first sensor/device 102, where the message includes a packet configured according to the packet format 101 to include a power value 142 of a current transmit power of the first sensor/device 102.

In one optional implementation, at block 528, the method 500 may include receiving a sixth message according to the protocol by the multi-capability device from the control panel, wherein the sixth message is configured to change the transmit power of the multi-capability device. For example, in an aspect, computing device 400, processor 402, memory 404, RF communication component 312, and/or receiving component 406 may be configured to or may comprise means for receiving a sixth message according to the protocol by the multi-capability device from the control panel, wherein the sixth message is configured to change the transmit power of the multi-capability device.

For example, in an aspect, the receiving at block 528 may include the first sensor/device 102 executing the receiving component 406 to receive a message according to the RF protocol 100 from the control panel 106, wherein the message includes a packet configured according to the packet format 101 to include a transmit power update 144 to update/change a transmit power of the first sensor/device 102.

In one optional implementation, at block 530, the method 500 may include updating the transmit power of the multi-capability device according to the sixth message. For example, in an aspect, computing device 400, processor 402, memory 404, RF communication component 312, and/or updating component 412 may be configured to or may comprise means for updating the transmit power of the multi-capability device according to the sixth message.

For example, in an aspect, the updating at block 530 may include the first sensor/device 102 executing the updating component 412 to update the transmit power of the first sensor/device 102 according to the transmit power update 144 received from the control panel 106 in a packet configured according to the packet format 101.

In one optional implementation, at block 532, the method 500 may include receiving a fourth message according to the protocol by the multi-capability device from the control panel, wherein the fourth message is configured to change a setting of the multi-capability device. For example, in an aspect, computing device 400, processor 402, memory 404, RF communication component 312, and/or receiving component 406 may be configured to or may comprise means for receiving a fourth message according to the protocol by the multi-capability device from the control panel, wherein the fourth message is configured to change a setting of the multi-capability device.

For example, in an aspect, the receiving at block 532 may include the first sensor/device 102 executing the receiving component 406 to receive a message according to the RF protocol 100 from the control panel 106, wherein the message is configured according to the packet format 101 to include a setting such as a capability setting 136 (e.g., to enable or disable a capability) or a wake/sleep setting 138 (e.g., to change a wake/sleep behavior/pattern) of the first sensor/device 102. In one optional implementation, for example, one or more setting changes may be specified in a message from the control panel 106 to a multi-capability device (e.g., the first sensor/device 102). In one optional implementation, for example, the control panel 106 may query a multi-capability device for the device's current setting values. In one optional implementation, for example, the control panel 106 may query a specific list of settings of a multi-capability device. In an alternative optional implementation, for example, a payload type of a message from the control panel 106 to a multi-capability device may indicate that all the settings of the multi-capability device are being queried.

In one optional implementation, at block 534, the method 500 may include updating the setting of the multi-capability device according to the fourth message. For example, in an aspect, computing device 400, processor 402, memory 404, RF communication component 312, and/or updating component 412 may be configured to or may comprise means for updating the setting of the multi-capability device according to the fourth message.

For example, in an aspect, the updating at block 534 may include the first sensor/device 102 executing the updating component 412 to update a setting of the first sensor/device 102 according to a capability setting 136 (e.g., to enable or disable a capability) or a wake/sleep setting 138 (e.g., to change a wake/sleep behavior/pattern) received from the control panel 106 in a packet configured according to the packet format 101.

In one optional implementation, the packet format 101 may define a packet payload for a packet, wherein the packet payload includes a packet identifier and payload data.

In one optional implementation, the packet identifier is encrypted with the payload data of the packet.

The below description of method 600 begins with optional blocks 602, 604, 606, and 608, which may be optionally performed prior to block 610.

Figure 8:
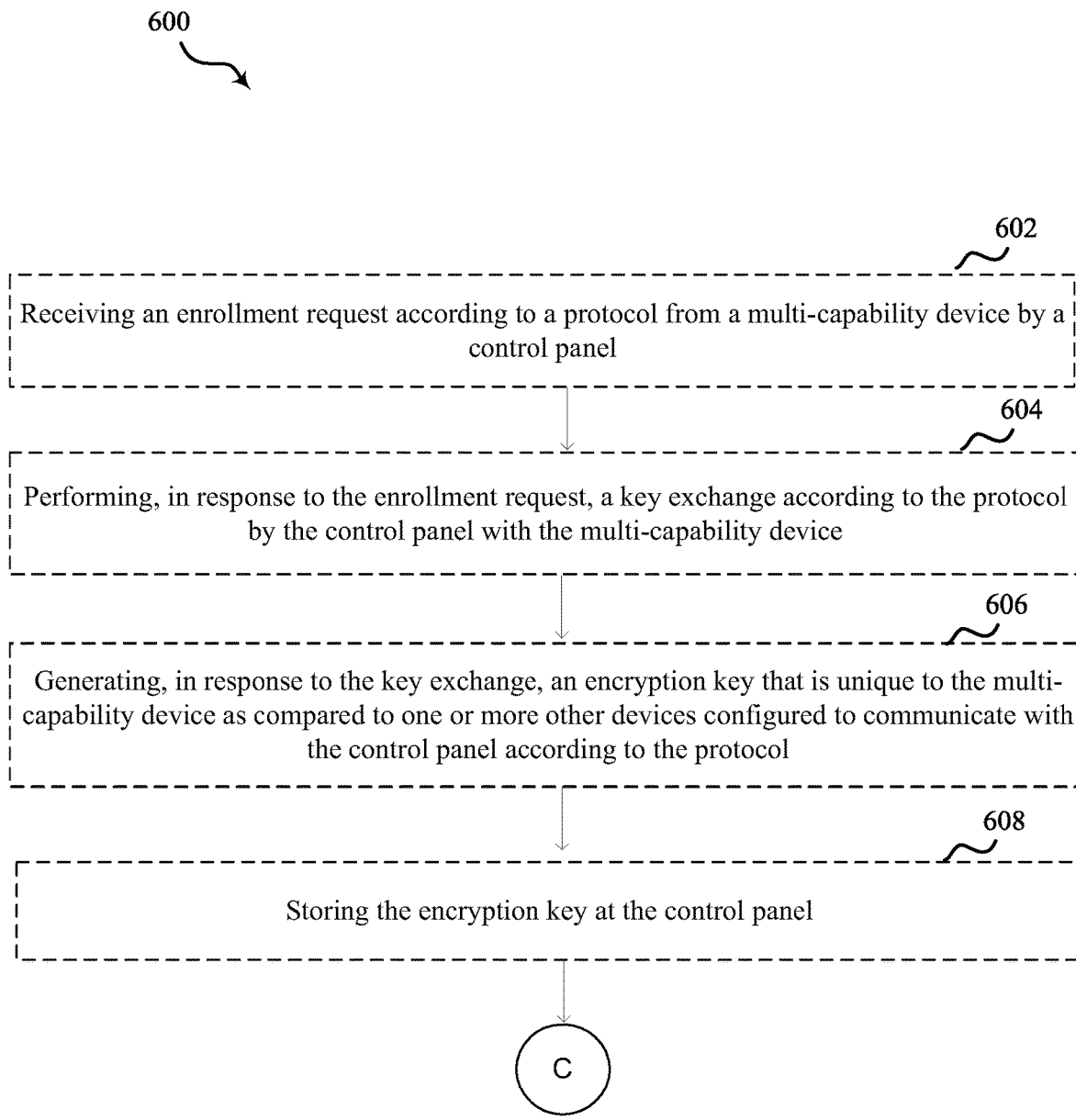
FIG. 8 is a flow diagram of a fourth example method for RF communication by a control panel in FIG. 1, according to some aspects.

Referring to FIG. 8, in one optional implementation, at block 602, the method 600 may include receiving an enrollment request according to a protocol from a multi-capability device by a control panel. For example, in an aspect, computing device 400, processor 402, memory 404, RF communication component 312, and/or receiving component 406 may be configured to or may comprise means for receiving an enrollment request according to a protocol from a multi-capability device by a control panel.

For example, in an aspect, the receiving at 602 may include the control panel 106 executing the receiving component 406 to receive an enrollment request according to the RF protocol 100 from the first sensor/device 102, for example, as described herein with reference to block 214 in FIG. 2. In an aspect, the first sensor/device 102 is a multi-capability sensor/device, which is a sensor/device that is operable to provide more than one capability, such as more than one measurement (e.g., door/window displacement, temperature, smoke, etc.) and/or more than one measurement type (e.g., temperature state and temperature value). In an aspect, using an enrollment process, a new sensor/device may be paired with the control panel. During the enrollment process, the new sensor/device and the control panel exchange the required information in order to be able to address each other and have the encryption keys to encrypt and decrypt messages for encrypted communication.

In one optional implementation, at block 604, the method 600 may include performing, in response to the enrollment request, a key exchange according to the protocol by the control panel with the multi-capability device. For example, in an aspect, computing device 400, processor 402, memory 404, RF communication component 312, and/or exchanging component 414 may be configured to or may comprise means for performing, in response to the enrollment request, a key exchange according to the protocol by the control panel with the multi-capability device.

For example, in one non-limiting aspect, the exchanging at block 504 may include the control panel 106 executing the exchanging component 414 to perform, in response to the enrollment request, a Diffie-Hellman key exchange according to the RF protocol 100 with the first sensor/device 102, for example, as described above with reference to blocks 226, 230, and 234 in FIG. 2.

In one optional implementation, at block 606, the method 600 may include generating, in response to the key exchange, an encryption key that is unique to the multi-capability device as compared to one or more other devices configured to communicate with the control panel according to the protocol. For example, in an aspect, computing device 400, processor 402, memory 404, RF communication component 312, and/or generating component 416 may be configured to or may comprise means for generating, in response to the key exchange, an encryption key that is unique to the multi-capability device as compared to one or more other devices configured to communicate with the control panel according to the protocol.

For example, in an aspect, the generating at block 606 may include the control panel 106 executing the generating component 416 to generate, in response to the key exchange, an encryption key that is unique to the first sensor/device 102 as compared to the second sensor/device 104 that is also configured to communicate with the control panel 106 according to the RF protocol 100, for example, as described above with reference to a Diffie-Hellman key exchange at blocks 232 and 236 in FIG. 2. For example, the first sensor/device 102 and the control panel 106 may perform a key exchange according to FIG. 2. During the key exchange, the first sensor/device 102 and the control panel 106 may use the first sensor private key 118 that is only known to the first sensor/device 102 and the first panel private key 122 that is only known to the control panel 106 to separately derive the first encryption key 120 for encrypted communication of the first packet 114 between the first sensor/device 102 and the control panel 106. The first encryption key 120 is unique to the first sensor/device 102 as compared to other devices that communicate with the control panel 106, such as the second sensor/device 104. In fact, the second sensor/device 104 and the control panel 106 may also perform a key exchange according to FIG. 2. During the key exchange, the second sensor/device 104 and the control panel 106 may use the second sensor private key 124 that is only known to the second sensor/device 104 and the second panel private key 131 that is only known to the control panel 106 to separately derive the second encryption key 128 for encrypted communication of the second packet 116 between the second sensor/device 104 and the control panel 106. The second encryption key 128 is unique to the second sensor/device 104 as compared to other devices that communicate with the control panel 106, such as the first sensor/device 102.

In one optional implementation, at block 608, the method 600 may include storing the encryption key at the control panel. For example, in an aspect, computing device 400, processor 402, memory 404, RF communication component 312, and/or storing component 418 may be configured to or may comprise means for storing the encryption key at the control panel.

For example, in an aspect, the storing at block 608 may include the control panel 106 executing the storing component 418 to store the first encryption key 120, e.g., at the memory 404 of the control panel 106, for example, as described above with reference to block 238 in FIG. 2.

Figure 9:
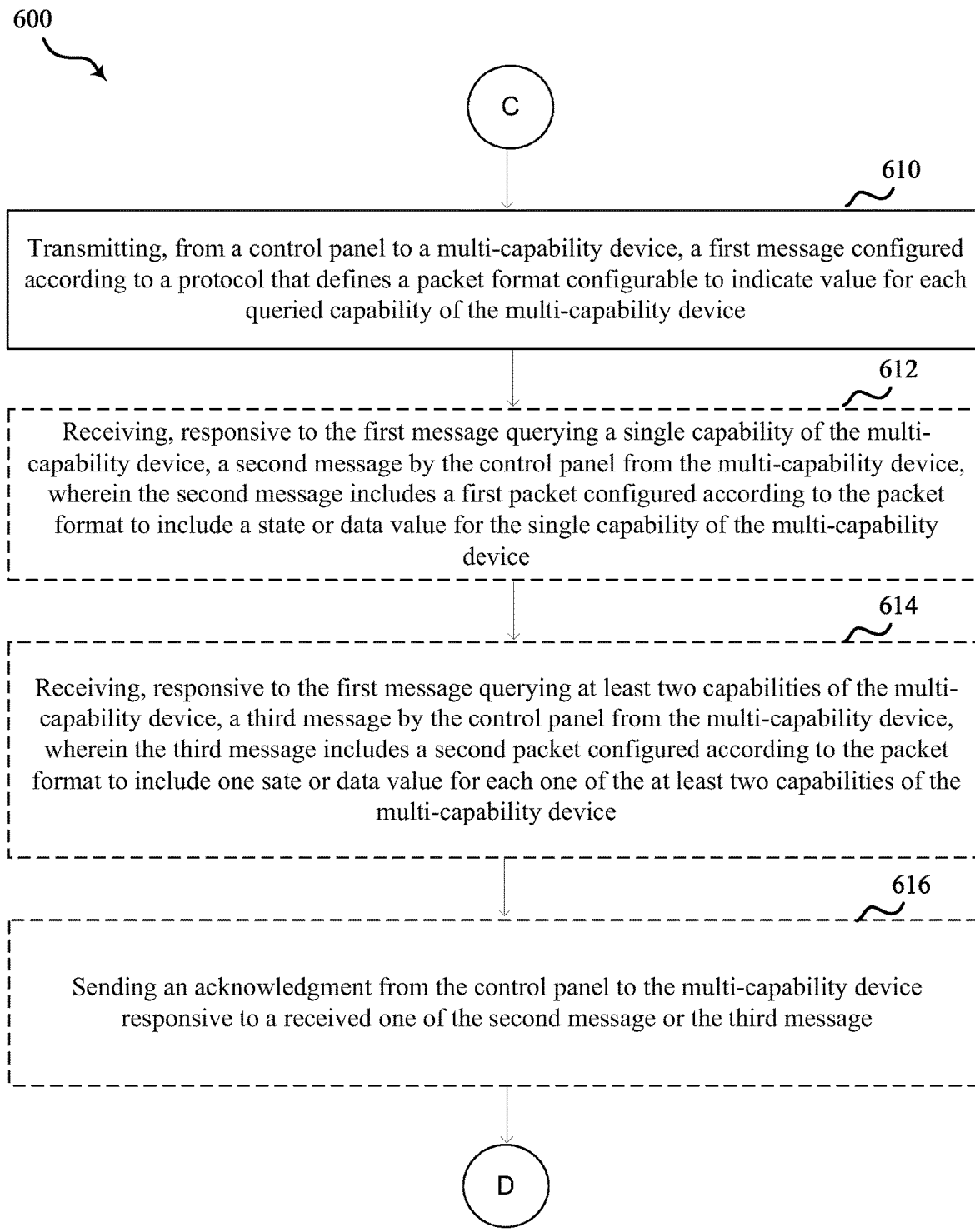
FIG. 9 is a flow diagram of a fifth example method for RF communication by a control panel in FIG. 1, according to some aspects.

Continuing to FIG. 9, at block 610, the method 600 includes transmitting, from a control panel to a multi-capability device, a first message configured according to a protocol that defines a packet format configurable to indicate each queried capability of the multi-capability device. For example, in an aspect, computing device 400, processor 402, memory 404, RF communication component 312, and/or transmitting component 408 may be configured to or may comprise means for transmitting, from a control panel to a multi-capability device, a first message configured according to a protocol that defines a packet format configurable to indicate each queried capability of the multi-capability device.

For example, in an aspect, the transmitting at block 610 may include the control panel 106 executing the transmitting component 408 to transmit, to the first sensor/device 102, a message including a packet that is configured according to the RF protocol 100 that defines a packet format 101 configurable to indicate each/every queried capability of the first sensor/device 102. In one optional implementation, for example, the control panel 106 may specify one or more capabilities for the multi-capability device to respond with the corresponding capability data values/states. For example, the control panel 106 may specify the capability type (e.g., a value corresponding to a specific capability) that the control panel 106 is querying the multi-capability device for. In an alternative optional implementation, for example, the control panel 106 may send a message where no capabilities are specified, but the payload type of the message indicates that the control panel 106 is querying all of the capabilities of the multi-capability device.

In one optional implementation, at block 612, the method 600 may include receiving, responsive to the first message querying a single capability of the multi-capability device, a second message by the control panel from the multi-capability device, wherein the second message includes a first packet configured according to the packet format to include a state or data value for the single capability of the multi-capability device. For example, in an aspect, computing device 400, processor 402, memory 404, RF communication component 312, and/or receiving component 406 may be configured to or may comprise means for receiving, responsive to the first message querying a single capability of the multi-capability device, a second message by the control panel from the multi-capability device, wherein the second message includes a first packet configured according to the packet format to include a state or data value for the single capability of the multi-capability device.

For example, in an aspect, the receiving at block 612 may include the control panel 106 executing the receiving component 406 to receive, responsive to transmitting a query message querying a single capability of the first sensor/device 102, a response message from the first sensor/device 102, wherein the response message includes a packet configured according to the packet format 101 to include a state or data value for the queried capability of the first sensor/device 102. For example, in an aspect, if the first sensor/device 102 receives a packet from the control panel 106 that is configured according to the packet format 101 to include a capability query 129 for only one of the multiple capabilities of the first sensor/device 102, then the first sensor/device 102 responds to the control panel 106 by sending a packet configured according to the packet format 101 to include a first capability state/data value 130 for the queried capability of the first sensor/device 102 (e.g., a temperature state such as "temperature above threshold," or a temperature value such as "70 degrees"). In one optional implementation, for example, the control panel 106 may specify a single capability for the multi-capability device to respond with the corresponding capability data value/state. For example, the control panel 106 may specify a single capability type (e.g., a value corresponding to a specific capability) that the control panel 106 is querying the multi-capability device for.

In one optional implementation, at block 614, the method 600 may include receiving, responsive to the first message querying at least two capabilities of the multi-capability device, a third message by the control panel from the multi-capability device, wherein the third message includes a second packet configured according to the packet format to include one state or data value for each one of the at least two capabilities of the multi-capability device. For example, in an aspect, computing device 400, processor 402, memory 404, RF communication component 312, and/or receiving component 406 may be configured to or may comprise means for receiving, responsive to the first message querying at least two capabilities of the multi-capability device, a third message by the control panel from the multi-capability device, wherein the third message includes a second packet configured according to the packet format to include one state or data value for each one of the at least two capabilities of the multi-capability device.

For example, in an aspect, the receiving at block 614 may include the control panel 106 executing the receiving component 406 to receive, responsive to transmitting a query message querying at least two capabilities of the first sensor/device 102, a response message from the first sensor/device 102, wherein the response message includes a packet configured according to the packet format 101 to include one state or data value for each one of the queried capabilities of the first sensor/device 102. For example, in an aspect, if the first sensor/device 102 receives a packet from the control panel 106 that is configured according to the packet format 101 to include a capability query 129 that queries a first as well as a second capability of the first sensor/device 102, then the first sensor/device 102 responds to the control panel 106 by sending a packet configured according to the packet format 101 to include a first capability state/data value 130 for the first queried capability of the first sensor/device 102 (e.g., a temperature state such as "temperature above threshold") as well as a second capability state/data value 132 for the second queried capability of the first sensor/device 102 (e.g., a temperature value such as "70 degrees"). In one optional implementation, for example, the control panel 106 may specify multiple capabilities for the multi-capability device to respond with the corresponding capability data values/states. For example, the control panel 106 may specify multiple capability types (e.g., multiple values corresponding to respective capabilities) that the control panel 106 is querying the multi-capability device for. In an alternative optional implementation, for example, the control panel 106 may send a message where no capabilities are specified, but the payload type of the message indicates that the control panel 106 is querying all of the capabilities of the multi-capability device.

In one optional implementation, at block 616, the method 600 may include sending an acknowledgment from the control panel to the multi-capability device responsive to a received one of the second message or the third message. For example, in an aspect, computing device 400, processor 402, memory 404, RF communication component 312, and/or transmitting component 408 may be configured to or may comprise means for sending an acknowledgment from the control panel to the multi-capability device responsive to a received one of the second message or the third message.

For example, in an aspect, the sending at block 616 may include the control panel 106 executing the transmitting component 408 to transmit a packet that includes an ACK 134 for each packet received from the first sensor/device 102.

In one optional implementation, each message communicated between the first sensor/device 102 and the control panel 106 is encrypted using the first encryption key 120 that is unique to the first sensor/device 102 as compared to one or more other devices configured to communicate with the control panel 106 according to the RF protocol 100, such as the second sensor/device 104. Similarly, each message communicated between the second sensor/device 104 and the control panel 106 is encrypted using the second encryption key 128 that is unique to the second sensor/device 104 as compared to one or more other devices configured to communicate with the control panel 106 according to the RF protocol 100, such as the first sensor/device 102.

Figure 10:
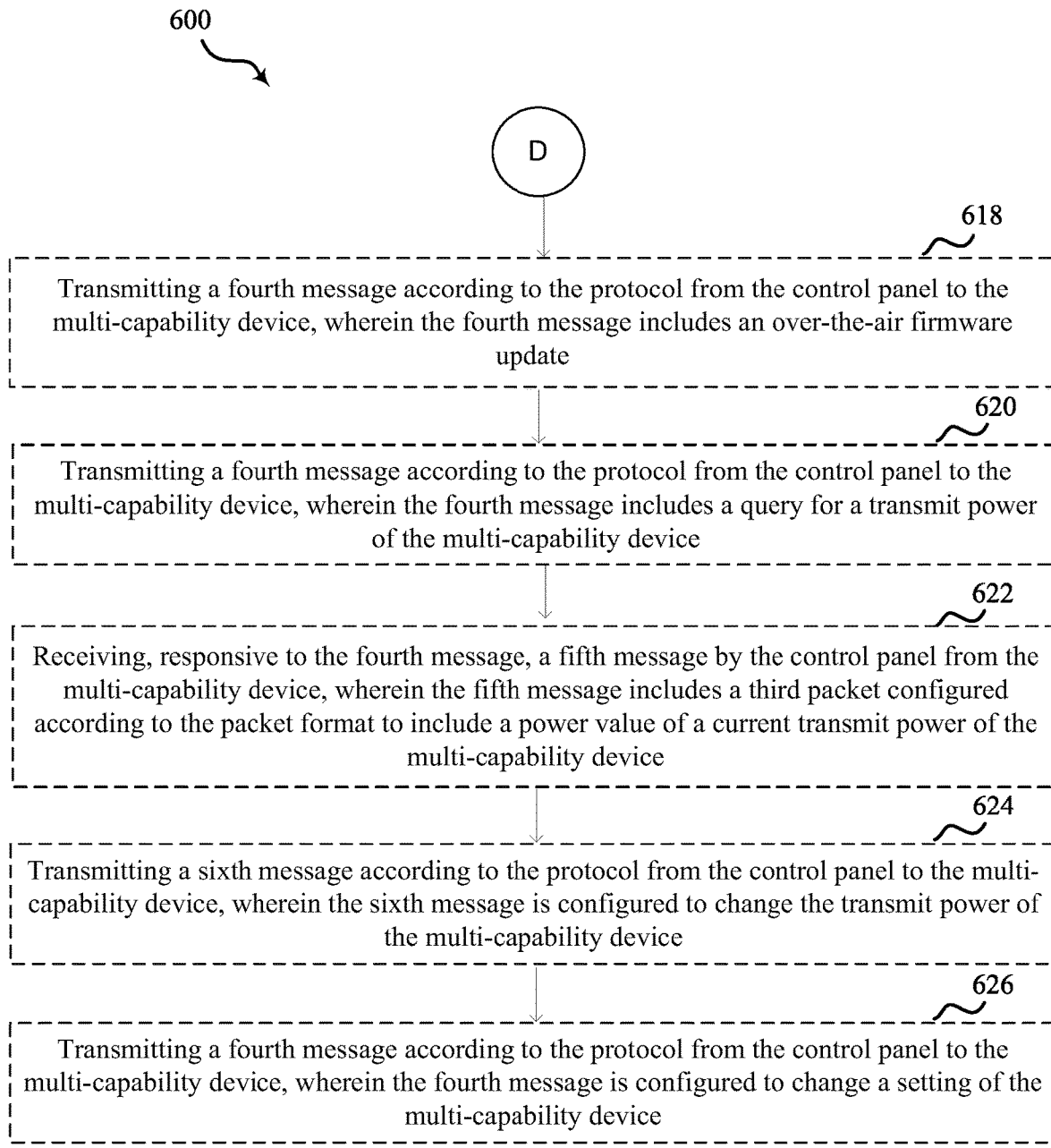
FIG. 10 is a flow diagram of a sixth example method for RF communication by a control panel in FIG. 1, according to some aspects.

Continuing to FIG. 10, in one optional implementation, at block 618, the method 600 may include transmitting a fourth message according to the protocol from the control panel to the multi-capability device, wherein the fourth message includes an over-the-air firmware update. For example, in an aspect, computing device 400, processor 402, memory 404, RF communication component 312, and/or transmitting component 408 may be configured to or may comprise means for transmitting a fourth message according to the protocol from the control panel to the multi-capability device, wherein the fourth message includes an over-the-air firmware update.

For example, in an aspect, the transmitting at block 618 may include the control panel 106 executing the transmitting component 408 to transmit a message according to the RF protocol 100 to the first sensor/device 102, wherein the message includes a packet configured according to the packet format 101 to include an over-the-air firmware update 140 for the first sensor/device 102.

In one optional implementation, at block 620, the method 600 may include transmitting a fourth message according to the protocol from the control panel to the multi-capability device, wherein the fourth message includes a query for a transmit power of the multi-capability device. For example, in an aspect, computing device 400, processor 402, memory 404, RF communication component 312, and/or transmitting component 408 may be configured to or may comprise means for transmitting a fourth message according to the protocol from the control panel to the multi-capability device, wherein the fourth message includes a query for a transmit power of the multi-capability device.

For example, in an aspect, the transmitting at block 620 may include the control panel 106 executing the transmitting component 408 to transmit a message according to the RF protocol 100 to the first sensor/device 102, wherein the message includes a packet configured according to the packet format 101 to include a power query 135 to query a current transmit power of the first sensor/device 102. In one optional implementation, for example, a multi-capability device (e.g., the first sensor/device 102) may keep track of the minimum, maximum, average, and most recent packet received signal strength indicator (RSSI) values. In these implementations, one or more of these values may be queried/requested by the control panel 106, and the control panel 106 may also request to reset one or more of these values (e.g., reset the running average).

In one optional implementation, at block 622, the method 600 may include receiving, responsive to the fourth message, a fifth message by the control panel 106 from the multi-capability device, wherein the fifth message includes a third packet configured according to the packet format to include a power value of a current transmit power of the multi-capability device. For example, in an aspect, computing device 400, processor 402, memory 404, RF communication component 312, and/or receiving component 406 may be configured to or may comprise means for receiving, responsive to the fourth message, a fifth message by the control panel from the multi-capability device, wherein the fifth message includes a third packet configured according to the packet format to include a power value of a current transmit power of the multi-capability device.

For example, in an aspect, the receiving at block 622 may include the control panel 106 executing the receiving component 406 to receive a message from the first sensor/device 102 responsive to a query for a current transmit power of the first sensor/device 102, where the message includes a packet configured according to the packet format 101 to include a power value 142 of a current transmit power of the first sensor/device 102.

In one optional implementation, at block 624, the method 600 may include transmitting a sixth message according to the protocol by the control panel to the multi-capability device, wherein the sixth message is configured to change the transmit power of the multi-capability device. For example, in an aspect, computing device 400, processor 402, memory 404, RF communication component 312, and/or transmitting component 408 may be configured to or may comprise means for transmitting a sixth message according to the protocol by the control panel to the multi-capability device, wherein the sixth message is configured to change the transmit power of the multi-capability device.

For example, in an aspect, the transmitting at block 624 may include the control panel 106 executing the transmitting component 408 to transmit a message according to the RF protocol 100 to the first sensor/device 102, wherein the message includes a packet configured according to the packet format 101 to include a transmit power update 144 to update/change a transmit power of the first sensor/device 102.

In one optional implementation, at block 626, the method 600 may include transmitting a fourth message according to the protocol by the control panel to the multi-capability device, wherein the fourth message is configured to change a setting of the multi-capability device. For example, in an aspect, computing device 400, processor 402, memory 404, RF communication component 312, and/or transmitting component 408 may be configured to or may comprise means for transmitting a fourth message according to the protocol by the control panel to the multi-capability device, wherein the fourth message is configured to change a setting of the multi-capability device.

For example, in an aspect, the transmitting at block 626 may include the control panel 106 executing the transmitting component 408 to transmit a message according to the RF protocol 100 to the first sensor/device 102, wherein the message is configured according to the packet format 101 to include a setting such as a capability setting 136 (e.g., to enable or disable a capability) or a wake/sleep setting 138 (e.g., to change a wake/sleep behavior/pattern) of the first sensor/device 102. In one optional implementation, for example, one or more setting changes may be specified in a message from the control panel 106 to a multi-capability device (e.g., the first sensor/device 102). In one optional implementation, for example, the control panel 106 may query a multi-capability device for the device's current setting values. In one optional implementation, for example, the control panel 106 may query a specific list of settings of a multi-capability device. In an alternative optional implementation, for example, a payload type of a message from the control panel 106 to a multi-capability device may indicate that all the settings of the multi-capability device are being queried Some further example aspects are provided below.

1. A method comprising:
   receiving, receiving, by a multi-capability device from a control panel, a first message configured according to a protocol that defines a packet format configurable to indicate each queried capability of the multi-capability device;
   transmitting, responsive to the first message querying a single capability of the multi-capability device, a second message from the multi-capability device to the control panel, wherein the second message includes a first packet configured according to the packet format to include a state or data value for the single capability of the multi-capability device; and
   transmitting, responsive to the first message querying at least two capabilities of the multi-capability device, a third message from the multi-capability device to the control panel, wherein the third message includes a second packet configured according to the packet format to include one state or data value for each one of the at least two capabilities of the multi-capability device.

2. The method of clause 1, further comprising:
   determining whether a transmitted one of the second message or the third message is received by the control panel based on whether the multi-capability device has received an acknowledgment for the transmitted one of the second message or the third message from the control panel; and
   retransmitting the transmitted one of the second message or the third message responsive to an absence of the acknowledgment from the control panel.

3. The method of any of the above clauses, wherein the first message and the transmitted one of the second message or the third message are encrypted using an encryption key that is unique to the multi-capability device as compared to one or more other devices configured to communicate with the control panel according to the protocol.

4. The method of any of the above clauses, further comprising:
   receiving a fourth message according to the protocol by the multi-capability device from the control panel, wherein the fourth message includes an over-the-air firmware update; and
   updating a firmware of the multi-capability device according to the over-the-air firmware update.

5. The method of any of the above clauses, further comprising:
   receiving a fourth message according to the protocol by the multi-capability device from the control panel, wherein the fourth message includes a query for a transmit power of the multi-capability device; and
   transmitting, responsive to the fourth message, a fifth message from the multi-capability device to the control panel, wherein the fifth message includes a third packet configured according to the packet format to include a power value of a current transmit power of the multi-capability device.

6. The method of any of the above clauses, further comprising:
   receiving a sixth message according to the protocol by the multi-capability device from the control panel, wherein the sixth message is configured to change the transmit power of the multi-capability device; and
   updating the transmit power of the multi-capability device according to the sixth message.

7. The method of any of the above clauses, wherein, prior to receiving the first message, the method further comprises:
   transmitting an enrollment request according to the protocol from the multi-capability device to the control panel;
   performing, in response to the enrollment request, a key exchange according to the protocol by the multi-capability device with the control panel;
   generating, in response to the key exchange, an encryption key that is unique to the multi-capability device as compared to one or more other devices configured to communicate with the control panel according to the protocol; and
   storing the encryption key at the multi-capability device.

8. The method of any of the above clauses, further comprising:
   receiving a fourth message according to the protocol by the multi-capability device from the control panel, wherein the fourth message is configured to change a setting of the multi-capability device; and
   updating the setting of the multi-capability device according to the fourth message.

9. The method of any of the above clauses, wherein the setting comprises a wake/sleep behavior of the multi-capability device.

10. The method of any of the above clauses, wherein the setting comprises enabling or disabling a capability of the multi-capability device by the control panel.

11. The method of any of the above clauses, wherein the packet format defines a packet payload for a packet, wherein the packet payload includes a packet identifier and payload data.

12. The method of any of the above clauses, wherein the packet identifier is encrypted with the payload data of the packet.

13. A method comprising:
    transmitting, from a control panel to a multi-capability device, a first message configured according to a protocol that defines a packet format configurable to indicate each queried capability of the multi-capability device;
    receiving, responsive to the first message querying a single capability of the multi-capability device, a second message by the control panel from the multi-capability device, wherein the second message includes a first packet configured according to the packet format to include a state or data value for the single capability of the multi-capability device; and
    receiving, responsive to the first message querying at least two capabilities of the multi-capability device, a third message by the control panel from the multi-capability device, wherein the third message includes a second packet configured according to the packet format to include one state or data value for each one of the at least two capabilities of the multi-capability device.

14. The method of clause 13, further comprising:
    sending an acknowledgement from the control panel to the multi-capability device responsive to a received one of the second message or the third message.

15. The method of clause 13 or 14, wherein the first message and the received one of the second message or the third message are encrypted using an encryption key that is unique to the multi-capability device as compared to one or more other devices configured to communicate with the control panel according to the protocol.

16. The method of any of clauses 13-15, further comprising:
    transmitting a fourth message according to the protocol from the control panel to the multi-capability device, wherein the fourth message includes an over-the-air firmware update.

17. The method of any of clauses 13-16, further comprising:
    transmitting a fourth message according to the protocol from the control panel to the multi-capability device, wherein the fourth message includes a query for a transmit power of the multi-capability device; and
    receiving, responsive to the fourth message, a fifth message by the control panel from the multi-capability device, wherein the fifth message includes a third packet configured according to the packet format to include a power value of a current transmit power of the multi-capability device.

18. The method of any of clauses 13-17, further comprising:
    transmitting a sixth message according to the protocol from the control panel to the multi-capability device, wherein the sixth message is configured to change the transmit power of the multi-capability device.

19. The method of any of clauses 13-18, wherein, prior to transmitting the first message, the method further comprises:
    receiving an enrollment request according to the protocol from the multi-capability device by the control panel;
    performing, in response to the enrollment request, a key exchange according to the protocol by the control panel with the multi-capability device;
    generating, in response to the key exchange, an encryption key that is unique to the multi-capability device as compared to one or more other devices configured to communicate with the control panel according to the protocol; and
    storing the encryption key at the control panel.

20. The method of any of clauses 13-19, further comprising:
    transmitting a fourth message according to the protocol from the control panel to the multi-capability device, wherein the fourth message is configured to change a setting of the multi-capability device, wherein the setting comprises a wake/sleep behavior of the multi-capability device or enabling or disabling a capability of the multi-capability device.

21. The method of any of the above clauses, wherein the packet format defines a packet payload for a packet, wherein the packet payload includes a packet identifier and payload data.

22. The method of any of the above clauses, wherein the packet identifier is encrypted with the payload data of the packet.

An apparatus comprising:
    a memory; and
    a processor communicatively coupled with the memory and configured to perform the method of any of the above clauses.

A non-transitory computer-readable medium storing instructions executable by a processor that, when executed, cause the processor to perform the method of any of the above clauses.

An apparatus comprising means for performing the method of any of the above clauses.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method comprising:
receiving, by a multi-sensor device comprising two or more sensors, from a control panel, a first message configured according to a protocol that defines a packet format configurable to query one or more sensors of the multi-sensor device, wherein the protocol defines at least three packet types for responding to the first message, including a "Data" packet type for sending data queried by the first message, an "ACK" packet type for acknowledging the first message, and an "ACK+Data" packet type for sending the data queried by the first message and also acknowledging the first message that queried the data;
determining, by the multi-sensor device, based on the first message, whether the control panel is querying all or only some of the two or more sensors of the multi-sensor device;
transmitting, responsive to the first message querying a single sensor of the multi-sensor device, a second message from the multi-sensor device to the control panel, wherein the second message includes a first packet configured according to the packet format to include a state or data value for the single sensor of the multi-sensor device; and
transmitting, responsive to the first message querying at least two sensors of the multi-sensor device, a third message from the multi-sensor device to the control panel, wherein the third message includes a second packet configured according to the packet format to include a header and a payload, the header indicating that a packet type of the second packet is the "ACK+Data" packet type configured to acknowledge the first message and also provide the data queried by the first message, the payload including one state or data value for each one of the at least two sensors of the multi-sensor device.

2. The method of claim 1, further comprising:
determining whether a transmitted one of the second message or the third message is received by the control panel based on whether the multi-sensor device has received an acknowledgment for the transmitted one of the second message or the third message from the control panel; and
retransmitting the transmitted one of the second message or the third message responsive to an absence of the acknowledgment from the control panel.

3. The method of claim 1, wherein the first message and a transmitted one of the second message or the third message are encrypted using an encryption key that is unique to the multi-sensor device as compared to one or more other devices configured to communicate with the control panel according to the protocol.

4. The method of claim 1, further comprising:
receiving a fourth message according to the protocol by the multi-sensor device from the control panel, wherein the fourth message includes an over-the-air firmware update; and
updating a firmware of the multi-sensor device according to the over-the-air firmware update.

5. The method of claim 1, further comprising:
receiving a fourth message according to the protocol by the multi-sensor device from the control panel, wherein the fourth message includes a query for a transmit power of the multi-sensor device; and
transmitting, responsive to the fourth message, a fifth message from the multi-sensor device to the control panel, wherein the fifth message includes a third packet configured according to the packet format to include a second header and a second payload, the second payload including a power value of a current transmit power of the multi-sensor device.

6. The method of claim 5, further comprising:
receiving a sixth message according to the protocol by the multi-sensor device from the control panel, wherein the sixth message is configured to change the transmit power of the multi-sensor device; and
updating the transmit power of the multi-sensor device according to the sixth message.

7. The method of claim 1, wherein, prior to receiving the first message, the method further comprises:
transmitting an enrollment request according to the protocol from the multi-sensor device to the control panel;
performing, in response to the enrollment request, a key exchange according to the protocol by the multi-sensor device with the control panel;
generating, in response to the key exchange, an encryption key that is unique to the multi-sensor device as compared to one or more other devices configured to communicate with the control panel according to the protocol; and
storing the encryption key at the multi-sensor device.

8. The method of claim 1, further comprising:
receiving a fourth message according to the protocol by the multi-sensor device from the control panel, wherein the fourth message is configured to change a setting of the multi-sensor device; and
updating the setting of the multi-sensor device according to the fourth message.

9. The method of claim 8, wherein the setting comprises a wake/sleep behavior of the multi-sensor device.

10. The method of claim 8, wherein the setting comprises enabling or disabling a sensor of the multi-sensor device by the control panel.

11. The method of claim 1, wherein the packet format defines a packet payload for a packet, wherein the packet payload includes a packet identifier and payload data.

12. The method of claim 11, wherein the packet identifier is encrypted with the payload data of the packet.

13. The method of claim 1, wherein when no sensors of the multi-sensor device are specified in the first message, a payload type of the first message indicates that the control panel is querying all sensors of the multi-sensor device.

14. The method of claim 13, wherein the first message includes a second header and a second payload, wherein the second header of the first message indicates the payload type of the first message.

15. A method comprising:
transmitting, from a control panel to a multi-sensor device comprising two or more sensors, a first message configured according to a protocol that defines a packet format configurable to query one or more sensors of the multi-sensor device, wherein the protocol defines at least three packet types for responding to the first message, including a "Data" packet type for sending data queried by the first message, an "ACK" packet type for acknowledging the first message, and an "ACK+Data" packet type for sending the data queried by the first message and also acknowledging the first message that queried the data, wherein the first message is configured to cause the multi-sensor device to determine, based on the first message, whether the control panel is querying all or only some of the two or more sensors of the multi-sensor device;

receiving, responsive to the first message querying a single sensor of the multi-sensor device, a second message by the control panel from the multi-sensor device, wherein the second message includes a first packet configured according to the packet format to include a state or data value for the single sensor of the multi-sensor device; and receiving, responsive to the first message querying at least two sensors of the multi-sensor device, a third message by the control panel from the multi-sensor device, wherein the third message includes a second packet configured according to the packet format to include a header and a payload, the header indicating that a packet type of the second packet is the "ACK+Data" packet type configured to acknowledge the first message and also provide the data queried by the first message, the payload including one state or data value for each one of the at least two sensors of the multi-sensor device.

16. The method of claim 15, further comprising:
sending an acknowledgement from the control panel to the multi-sensor device responsive to a received one of the second message or the third message.

17. The method of claim 15, wherein the first message and a received one of the second message or the third message are encrypted using an encryption key that is unique to the multi-sensor device as compared to one or more other devices configured to communicate with the control panel according to the protocol.

18. The method of claim 15, further comprising:
transmitting a fourth message according to the protocol from the control panel to the multi-sensor device, wherein the fourth message includes an over-the-air firmware update.

19. The method of claim 15, further comprising:
transmitting a fourth message according to the protocol from the control panel to the multi-sensor device, wherein the fourth message includes a query for a transmit power of the multi-sensor device; and
receiving, responsive to the fourth message, a fifth message by the control panel from the multi-sensor device, wherein the fifth message includes a third packet configured according to the packet format to include a second header and a second payload, the second payload including a power value of a current transmit power of the multi-sensor device.

20. The method of claim 19, further comprising:
transmitting a sixth message according to the protocol from the control panel to the multi-sensor device, wherein the sixth message is configured to change the transmit power of the multi-sensor device.

21. The method of claim 15, wherein, prior to transmitting the first message, the method further comprises:
receiving an enrollment request according to the protocol from the multi-sensor device by the control panel;
performing, in response to the enrollment request, a key exchange according to the protocol by the control panel with the multi-sensor device;
generating, in response to the key exchange, an encryption key that is unique to the multi-sensor device as compared to one or more other devices configured to communicate with the control panel according to the protocol; and
storing the encryption key at the control panel.

22. The method of claim 15, further comprising:
transmitting a fourth message according to the protocol from the control panel to the multi-sensor device, wherein the fourth message is configured to change a setting of the multi-sensor device, wherein the setting comprises a wake/sleep behavior of the multi-sensor device or enabling or disabling a capability of the multi-sensor device.

23. An apparatus comprising:
a memory; and
a processor communicatively coupled with the memory and configured to:
receive, by a multi-sensor device comprising two or more sensors, from a control panel, a first message configured according to a protocol that defines a packet format configurable to query one or more sensors of the multi-sensor device, wherein the protocol defines at least three packet types for responding to the first message, including a "Data" packet type for sending data queried by the first message, an "ACK" packet type for acknowledging the first message, and an "ACK+Data" packet type for sending the data queried by the first message and also acknowledging the first message that queried the data;
determine, by the multi-sensor device, based on the first message, whether the control panel is querying all or only some of the two or more sensors of the multi-sensor device;
transmit, responsive to the first message querying a single sensor of the multi-sensor device, a second message from the multi-sensor device to the control panel, wherein the second message includes a first packet configured according to the packet format to include a state or data value for the single sensor of the multi-sensor device; and
transmit, responsive to the first message querying at least two sensors of the multi-sensor device, a third message from the multi-sensor device to the control panel, wherein the third message includes a second packet configured according to the packet format to include a header and a payload, the header indicating that a packet type of the second packet is the "ACK+Data" packet type configured to acknowledge the first message and also provide the data queried by the first message, the payload including one state or data value for each one of the at least two sensors of the multi-sensor device.

24. An apparatus comprising:
a memory; and
a processor communicatively coupled with the memory and configured to:
transmit, from a control panel to a multi-sensor device comprising two or more sensors, a first message configured according to a protocol that defines a packet format configurable to query one or more sensors of the multi-sensor device, wherein the protocol defines at least three packet types for responding to the first message, including a "Data" packet type for sending data queried by the first message, an "ACK" packet type for acknowledging the first message, and an "ACK+Data" packet type for sending the data queried by the first message and also acknowledging the first message that queried the data, wherein the first message is configured to cause the multi-sensor device to determine, based on the first message, whether the control panel is querying all or only some of the two or more sensors of the multi-sensor device;

receive, responsive to the first message querying a single sensor of the multi-sensor device, a second message by the control panel from the multi-sensor device, wherein the second message includes a first packet configured according to the packet format to include a state or data value for the single sensor of the multi-sensor device; and receive, responsive to the first message querying at least two sensors of the multi-sensor device, a third message by the control panel from the multi-sensor device, wherein the third message includes a second packet configured according to the packet format to include a header and a payload, the header indicating that a packet type of the second packet is the "ACK+ Data" packet type configured to acknowledge the first message and also provide the data queried by the first message, the payload including one state or data value for each one of the at least two sensors of the multi-sensor device.

* * * * *